(12) United States Patent
Seol et al.

(10) Patent No.: US 10,809,907 B2
(45) Date of Patent: Oct. 20, 2020

(54) MOBILE TERMINAL AND CONTROL METHOD THEREOF

(71) Applicant: LG ELECTRONICS INC., Seoul (KR)

(72) Inventors: Jie Seol, Seoul (KR); Soyeon Yim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 65 days.

(21) Appl. No.: 15/756,834

(22) PCT Filed: Mar. 23, 2016

(86) PCT No.: PCT/KR2016/002944
§ 371 (c)(1),
(2) Date: Mar. 1, 2018

(87) PCT Pub. No.: WO2017/039103
PCT Pub. Date: Mar. 9, 2017

(65) Prior Publication Data
US 2018/0275850 A1 Sep. 27, 2018

(30) Foreign Application Priority Data
Sep. 2, 2015 (KR) .................. 10-2015-0124514

(51) Int. Cl.
*G06F 3/0486* (2013.01)
*G06F 3/041* (2006.01)
(Continued)

(52) U.S. Cl.
CPC ............ *G06F 3/0486* (2013.01); *G06F 3/044* (2013.01); *G06F 3/0416* (2013.01);
(Continued)

(58) Field of Classification Search
CPC .... G06F 3/0486; G06F 3/0414; G06F 3/0416; G06F 3/0484; G06F 3/04883;
(Continued)

(56) References Cited

U.S. PATENT DOCUMENTS

2009/0174677 A1 7/2009 Gehani et al.
2010/0269038 A1* 10/2010 Tsuda ............... G06F 3/0485
715/702
(Continued)

FOREIGN PATENT DOCUMENTS

JP 2010-11137 A 1/2010
JP 2013-25594 A 2/2013
(Continued)

*Primary Examiner* — Jennifer N To
*Assistant Examiner* — Ashley M Fortino
(74) *Attorney, Agent, or Firm* — Birch, Stewart, Kolasch & Birch, LLP

(57) ABSTRACT

A mobile terminal including a wireless communication unit configured to provide wireless communication; a touch screen; and a controller configured to display a video screen on the touch screen; in response to a touch and drag on the touch screen with a first finger and without an additional touch pressure applied with the first finger at an end of the touch and drag, display another video screen on the touch screen; in response to the touch and drag on the touch screen with the first finger and with the additional touch pressure applied with the first finger at the end of the touch and drag, control a playback speed of a video on the video screen to correspond to a strength of the additional touch pressure applied with the first finger; and in response to the touch and drag on the touch screen with the first finger and with the additional touch pressure applied with a second finger at the end of the touch and drag with the first finger, control the playback speed of the video on the video screen to correspond to a strength of the additional touch pressure applied with the second finger.

20 Claims, 25 Drawing Sheets

(51) Int. Cl.
*G06F 3/0484* (2013.01)
*G06F 3/0488* (2013.01)
*G06F 3/044* (2006.01)
*H04M 1/725* (2006.01)

(52) U.S. Cl.
CPC ........ *G06F 3/0484* (2013.01); *G06F 3/04847* (2013.01); *G06F 3/04883* (2013.01); *G06F 3/0414* (2013.01); *G06F 2203/04101* (2013.01); *G06F 2203/04105* (2013.01); *H04M 1/72552* (2013.01); *H04M 2250/22* (2013.01); *H04M 2250/74* (2013.01)

(58) Field of Classification Search
CPC ................. G06F 3/044; G06F 3/04847; G06F 2203/04105; G06F 2203/04101; H04M 2250/22; H04M 2250/74; H04M 1/7255
See application file for complete search history.

(56) References Cited

U.S. PATENT DOCUMENTS

2012/0079386 A1* 3/2012 Kim ...................... G06F 3/0485
715/720
2014/0160035 A1* 6/2014 Sauer ...................... G06F 3/041
345/173
2015/0339006 A1* 11/2015 Chaland ................ G06F 3/0482
715/835

FOREIGN PATENT DOCUMENTS

KR 10-2014-0067861 A 6/2014
KR 10-2014-0070264 A 6/2014

\* cited by examiner

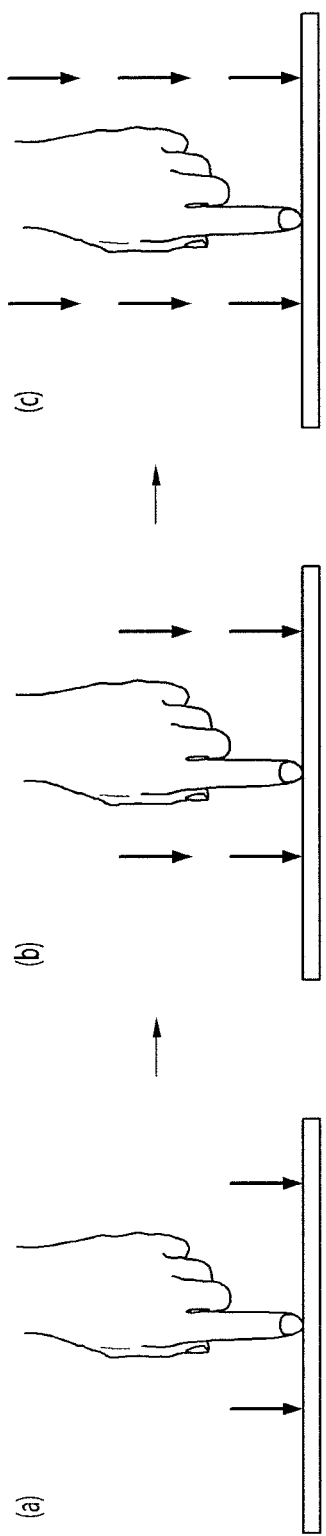

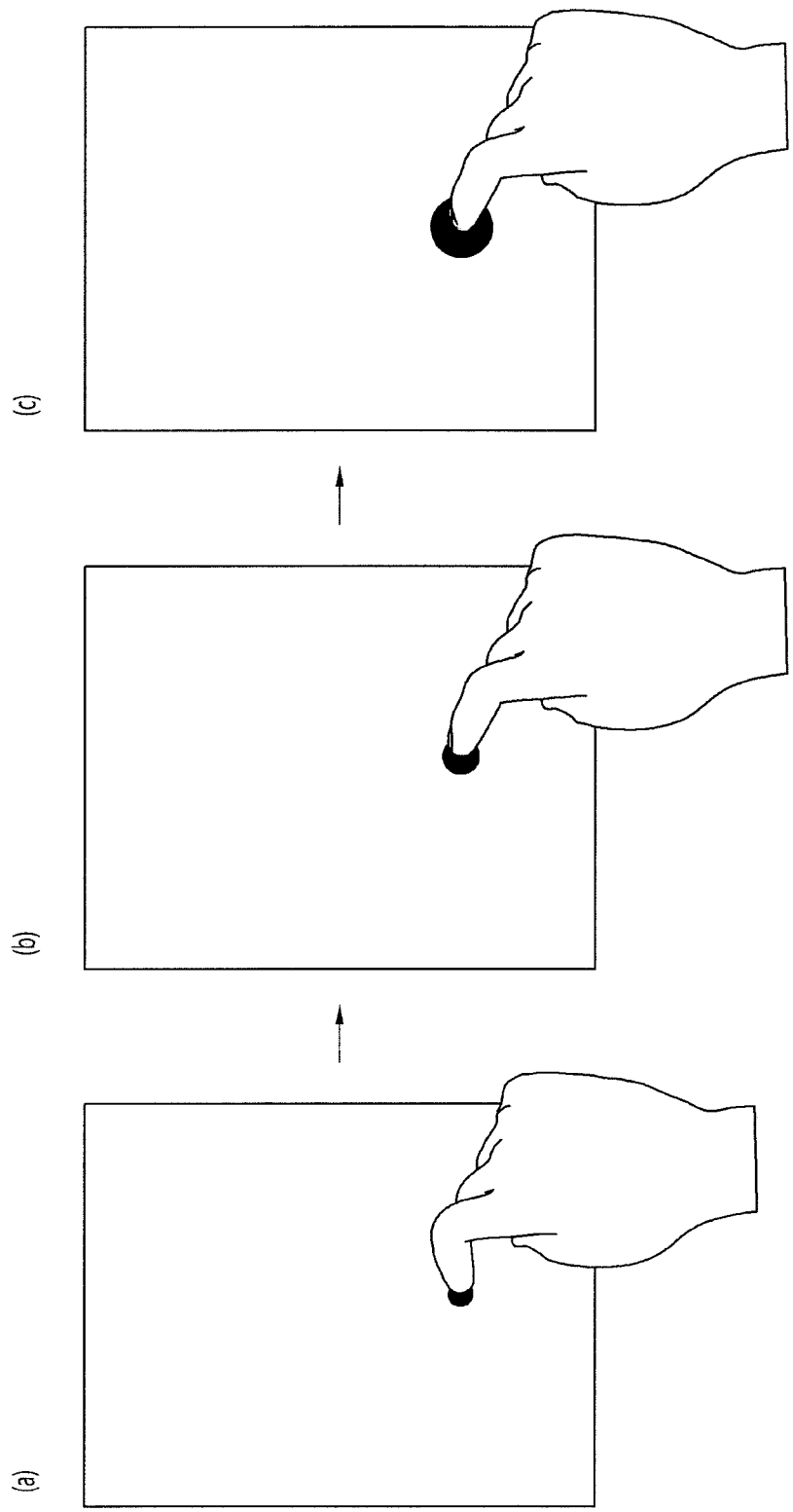

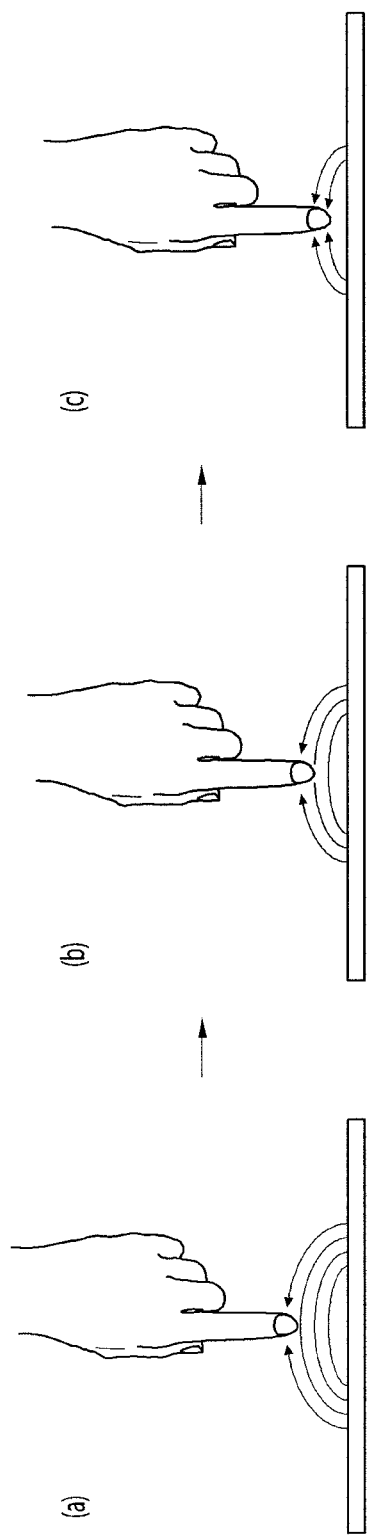

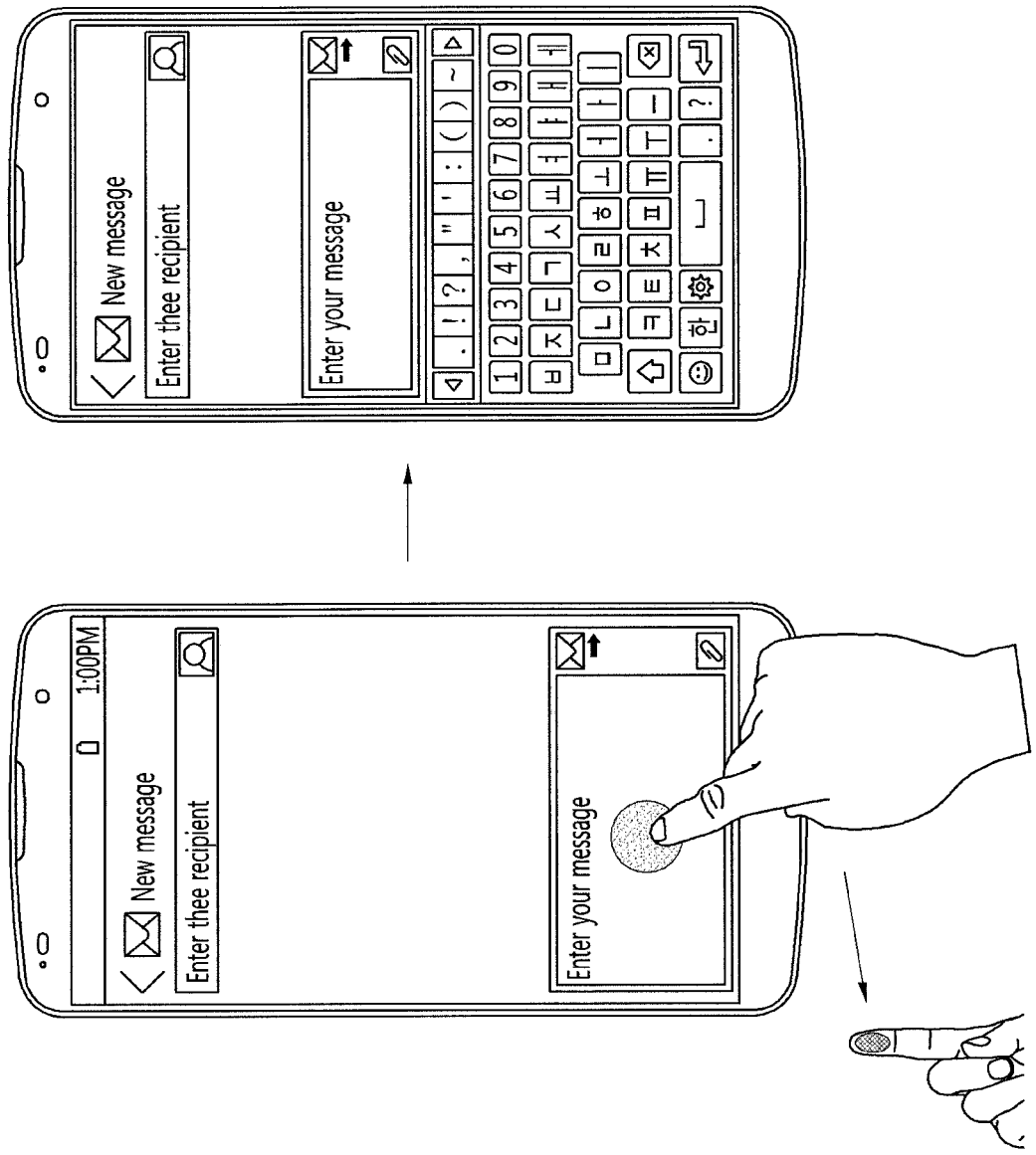

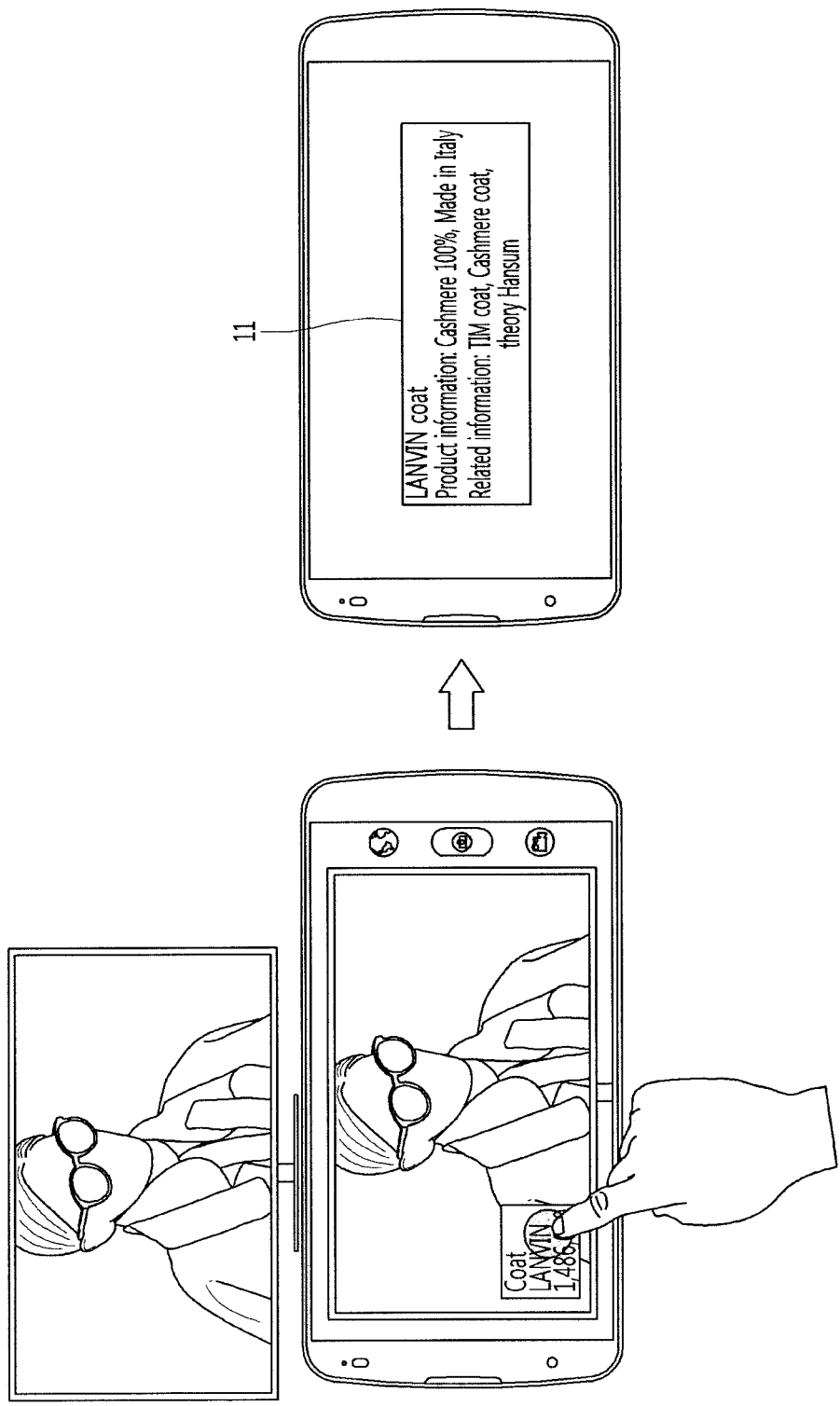

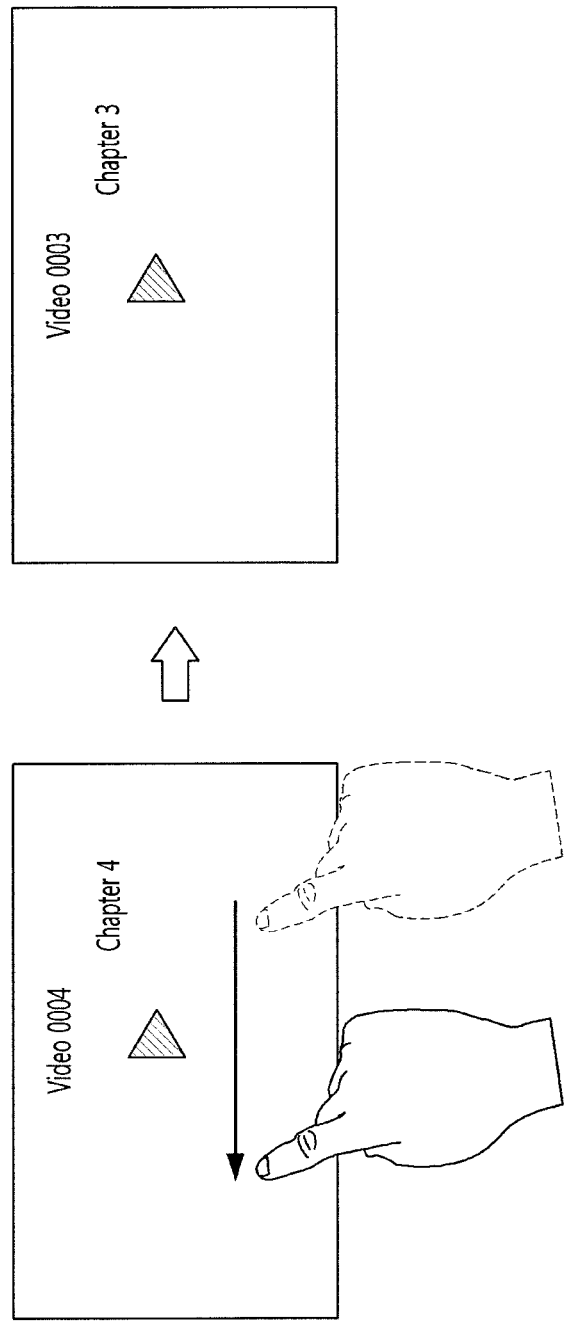

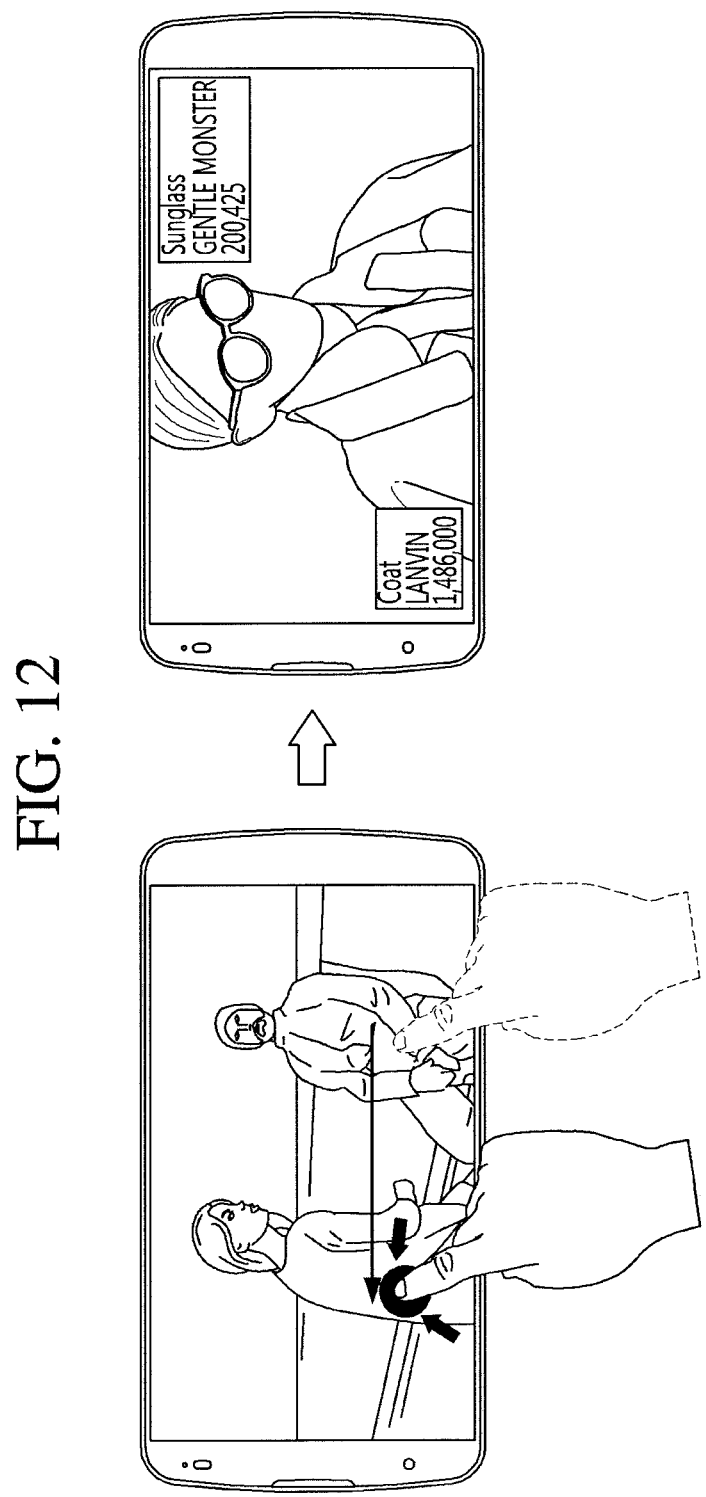

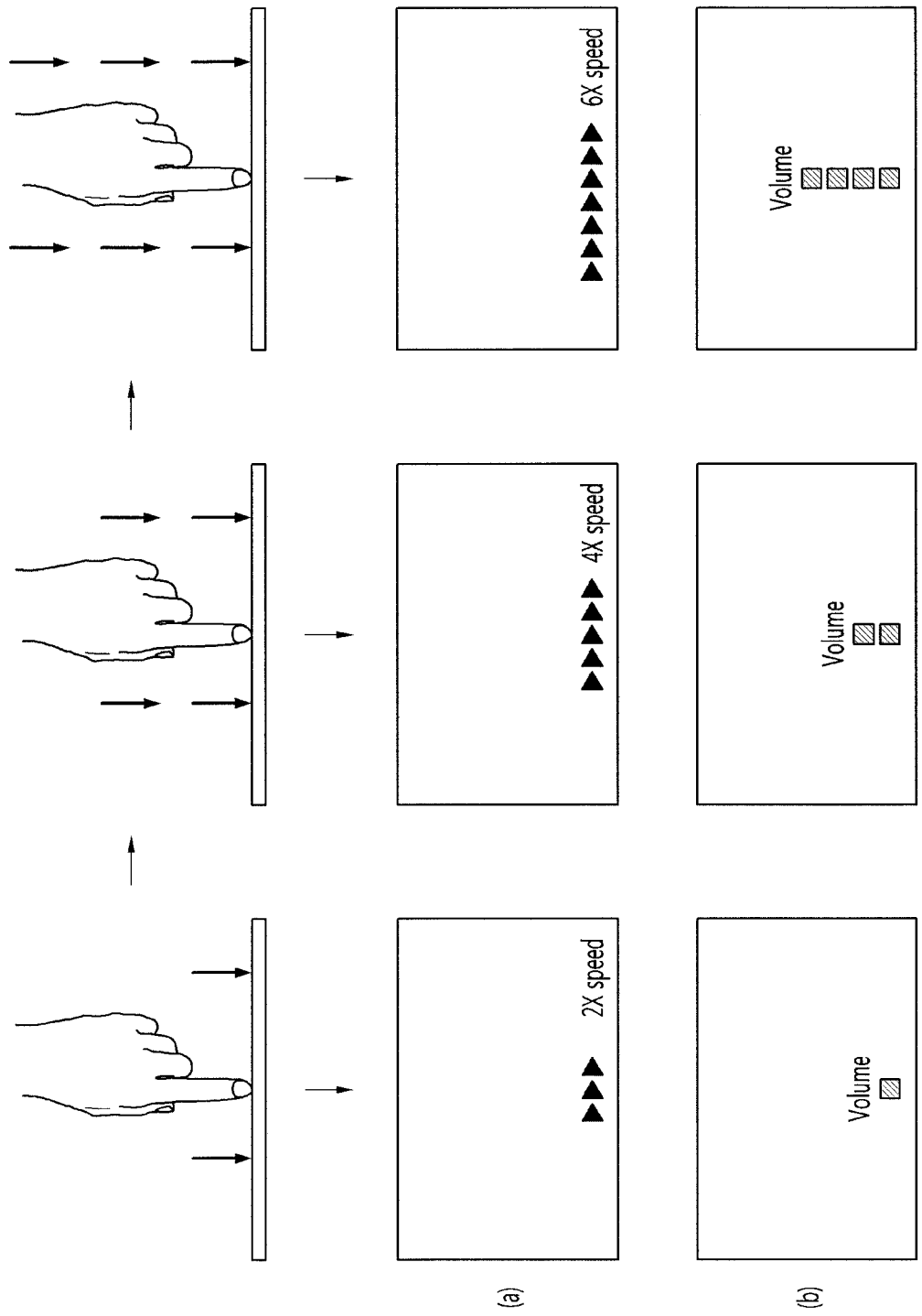

MOBILE TERMINAL AND CONTROL METHOD THEREOF

CROSS REFERENCE TO THE RELATED APPLICATIONS

This application is the National Phase of PCT International Application No. PCT/KR2016/002944, filed on Mar. 23, 2016, which claims priority under 35 U.S.C. § 119(a) to Patent Application No. 10-2015-0124514, filed in Republic of Korea on Sep. 2, 2015, all of which are hereby expressly incorporated by reference into the present application.

TECHNICAL FIELD

The present invention relates to a mobile terminal and a control method thereof, and more particularly, to a mobile terminal that provides a new user experience (UX) to a user through a touch interface that is capable of providing new and various user manipulations and further provides a touch interface is capable of intuitively and conveniently controlling an application and a control method thereof.

BACKGROUND ART

Touch interfaces are the most common and widely used technologies among user interfaces (UI) that exist today. Such a touch interface has evolved with the explosive growth of mobile devices and evolves toward the implementation of a user-friendly interface that is capable of capturing various movements related to touch to more conveniently operate.

Furthermore, with the trends to enhance a user experience (UX) for electronic products, there is a need for a touch interface that is capable of providing more new and various types of user manipulation.

SUMMARY OF THE INVENTION

The present invention provides a touch interface that provides various types of user manipulation, which is capable of intuitively and conveniently manipulated by a user.

The object of the present invention is not limited to the aforesaid, but other objects not described herein will be clearly understood by those skilled in the art from descriptions below.

A mobile terminal according to an embodiment of the present invention includes: a user input unit configured to receive a first operation for dragging a screen from one side to the other side, a second operation for applying a pressure to touch the screen, and a third operation for performing a multi-touch on the other region while touching one region on the screen from the user; a sensing unit configured to recognize the first operation, the second operation, and the third operation; and a control unit configured to control the sensing unit to allow the sensing unit to recognize the first operation, the second operation, and the third operation and control a playback speed of a video to correspond to strength of the second operation or the third operation when the second is successively inputted after the first operation is inputted or when the third operation is inputted after the first operation is inputted.

Also, a method for controlling a mobile terminal according to an embodiment of the present invention includes: receiving a first operation for dragging a screen from one side to the other side, a second operation for applying a pressure to touch the screen, and a third operation for performing a multi-touch on the other region while touching one region on the screen from the user; recognizing the first operation, the second operation, and the third operation; and controlling the sensing unit to allow the sensing unit to recognize the first operation, the second operation, and the third operation and controlling a playback speed of a video to correspond to strength of the second operation or the third operation when the second is successively inputted after the first operation is inputted or when the third operation is inputted after the first operation is inputted.

According to the embodiments of the present invention, the user may provide the new user experience through the touch interface that is capable of being manipulated in the various manners.

Furthermore, the user may intuitively and conveniently the touch interface to improve the user's convenience.

BRIEF DESCRIPTION OF THE DRAWINGS

FIG. 5 is a view illustrating a process of controlling strength of the pressure touch according to an embodiment of the present invention.

FIG. 6 is a view illustrating a process of controlling strength of the haptic touch according to an embodiment of the present invention.

FIG. 7 is a view illustrating a process of strength of the proximity touch according to an embodiment of the present invention.

FIGS. 9A and 9B are views illustrating a state in which a different subsequent operation is executed in a write mode in response to the general touch and the pressure touch according to an embodiment of the present invention.

FIGS. 10A and 10B are views illustrating a state in which a different subsequent operation is executed in an augmented reality mode in response to the general touch and the pressure touch according to an embodiment of the present invention.

FIGS. 11A and 11B are views illustrating a state in which a different subsequent operation is executed in a video application in response to a drag operation and the pressure touch according to an embodiment of the present invention.

FIG. 12 is a view illustrating a state in which product information is displayed in the AR mode in response to the drag operation and the pressure touch according to an embodiment of the present invention.

FIG. 14 is a view illustrating a process of controlling an application to correspond to strength of the pressure touch according to an embodiment of the present invention.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
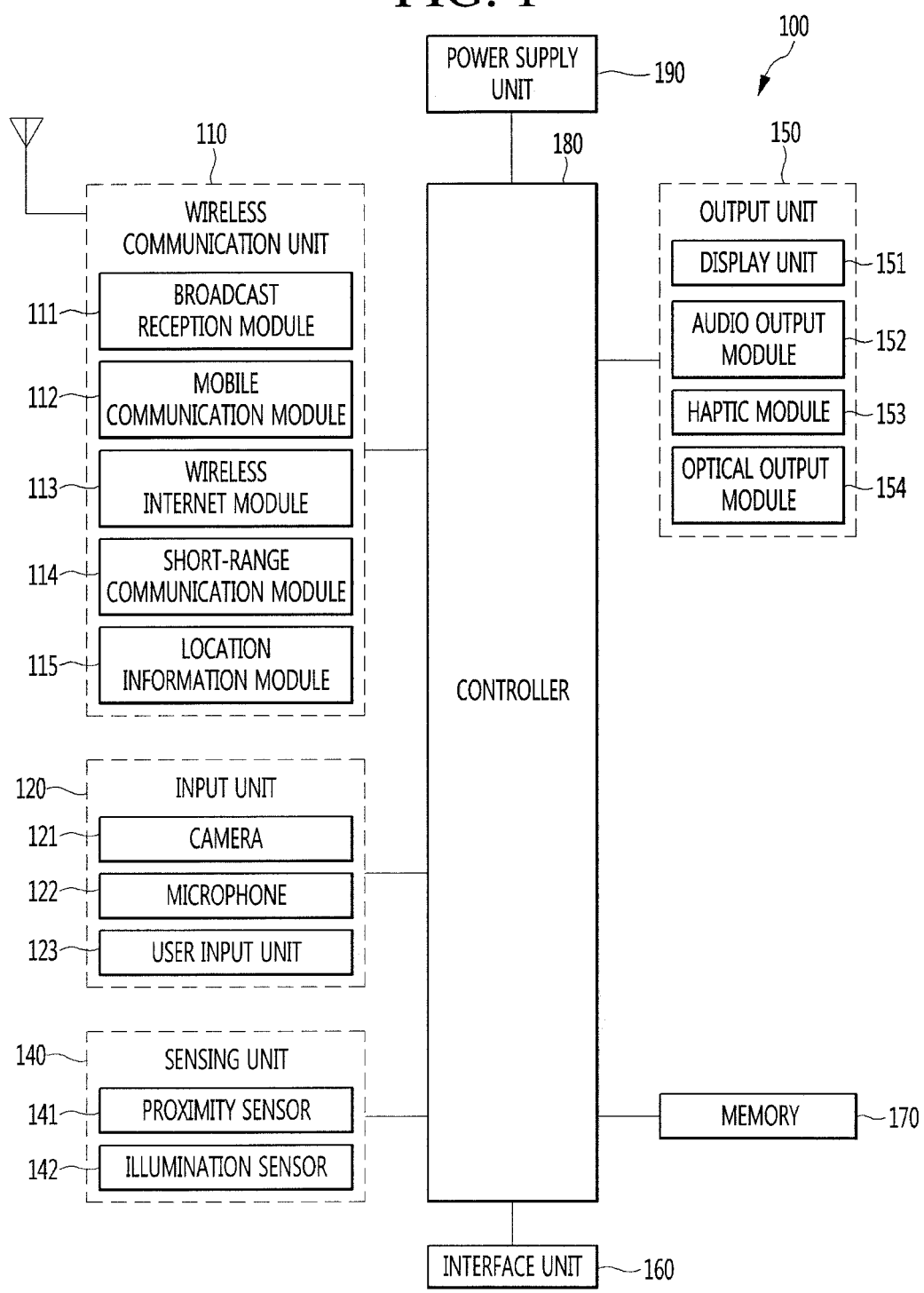
FIG. 1 is a block diagram for explaining a mobile terminal according to the present invention.

Reference is now made to FIG. 1, where FIG. 1 is a block diagram for explaining a mobile terminal according to the present invention.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

More particularly, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1, or activating application programs stored in the memory 170.

As one example, the control unit 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a portion of the abovementioned components may operate by cooperating with each other to realize the operation, control, or the control method of the mobile terminal according to various embodiments. Also, the operation, the control, or the control method of the mobile terminal may be realized on the mobile terminal by the driving of at least one application program stored in the memory 170

Hereinafter, various components depicted in this figure will now be described in more detail with reference to FIG. 1.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sensing unit 140 to control operation of the mobile terminal 100 or execute data processing, a function Or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured according to any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the team "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The info/Lotion of the wireless AP extracted based on the location information request message of the mobile terminal 100 may include one or more of media access control (MAC) address, service set identification (SSID), received signal strength indicator (RSSI), reference signal received power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Figure 2:
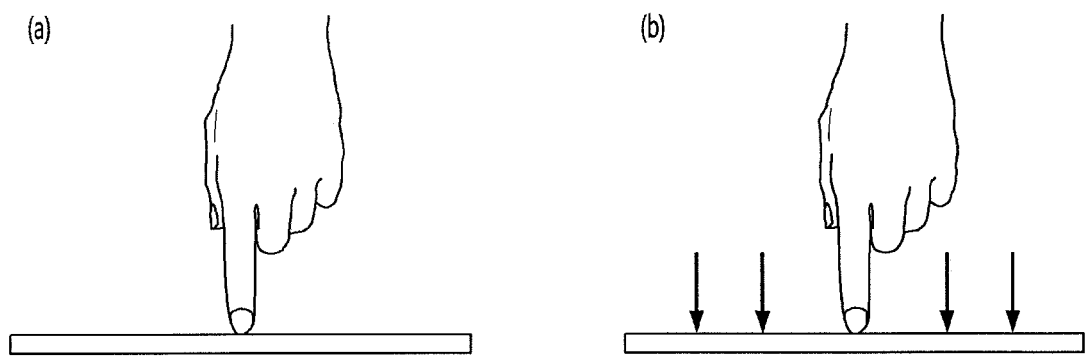
FIG. 2 is a view for explaining a general touch a pressure touch according to an embodiment of the present invention.

FIG. 2 is a view for explaining a general touch a pressure touch according to an embodiment of the present invention.

According to an embodiment of the present invention, a touch operation of a user may be classified into a general touch and a pressure touch according to a touch pressure.

A left drawing (a) illustrates the general touch. When the user normally operates to touch a touch screen, a mobile terminal (hereinafter, referred to as a mobile terminal) may recognize the touch as a general touch.

A right drawing (b) illustrates a pressure touch. When the user operates to press the touch screen while applying a pressure, the mobile terminal recognizes the touch as a pressure touch.

The pressure touch may be recognized through various methods according to an embodiment. Hereinafter, an inner structure of the mobile terminal for recognizing the pressure touch and a specific method for recognizing the pressure touch through the inner structure will be described with reference to FIGS. 20a to 20c.

Figure 20A:
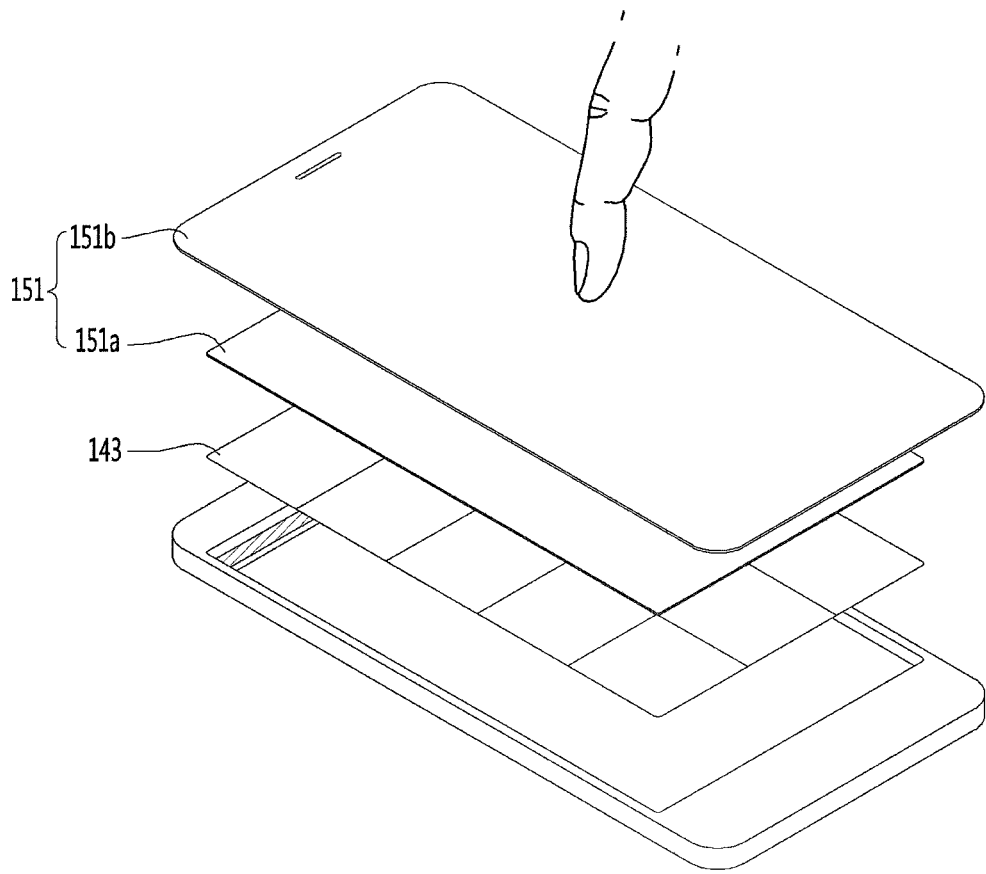
FIGS. 20A to 20C are views for explaining various methods for recognizing the pressure touch according to an embodiment of the present invention.
Figure 20B:
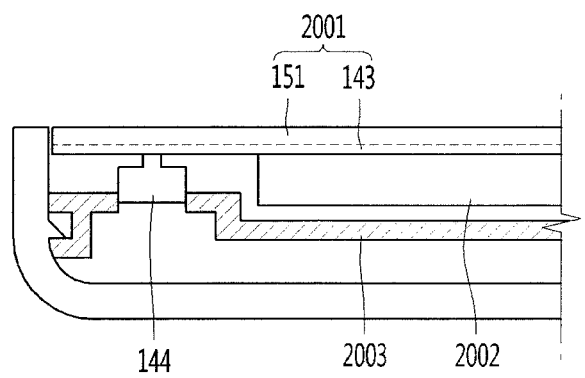
Figure 20C:
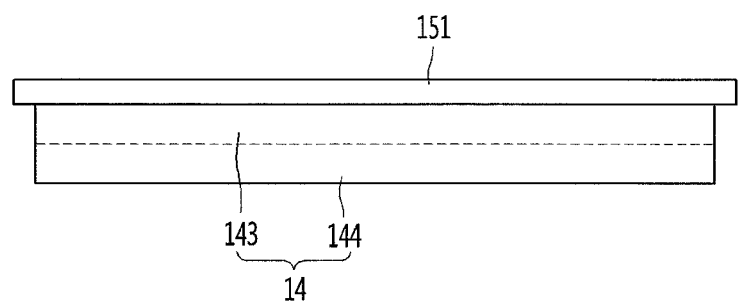

FIGS. 20A to 20C are views for explaining various methods for recognizing the pressure touch according to an embodiment of the present invention.

FIG. 20A illustrates a case in which the pressure touch is recognized through an electrostatic capacity method.

To recognize the pressure touch through the electrostatic capacity method, the mobile terminal 100 may be configured so that a touch sensor 143 and a display unit 151 has a layer structure. In this case, the display unit 151 includes a display 151a receiving the pressure touch and a tempered glass 151b protecting a surface of the display 151a. The touch sensor 143 is disposed at a lower layer of the display 151a. In this case, the touch sensor 143 may be an electrostatic touch sensor.

Particularly, when a pressure is applied to the tempered glass 151b, the touch sensor 143 detects a fine pressure difference (i.e., a distance between the tempered glass 151b and a backlight (not shown) to recognize the detected pressure as a resistance value. When the tempered glass 151b is simply touched, since the pressure is low, and the resistance is also weak, a voltage is high. On the other hand, when the tempered glass 151b is touched by the pressure, since the pressure increases, and the resistance also increases, the voltage is low. Thus, the general touch and the pressure touch may be distinguished from each other.

FIG. 20B illustrates a case in which the pressure touch is recognized by the pressure sensor.

To recognize the pressure touch by the pressure sensor, the mobile terminal 100 may include a touch screen 2001 and a pressure sensor 144. In this case, the touch screen 2001 may be configured so that the display unit 151 and the touch sensor 143 are integrally formed.

The pressure sensor 144 is disposed at the lower layer of the touch screen 2001. Particularly, the pressure sensor 114 may be disposed between the touch screen 2001 and a back plate 2003 and supported by the back plate 2003. A liquid crystal display (LCD) 2002 may be further disposed between the touch screen 2001 and the back plate 2003.

A plurality of pressure sensors 144 may be provided to efficiently recognize the pressure applied to the touch screen 2001. The plurality of pressure sensors 144 may be respectively disposed at predetermined positions to recognize a pressure at the corresponding position. The pressure applied to the touch screen 2001 may be measured based on pressure values inputted at a plurality of points, which are respectively measured by the plurality of pressure sensors 144, and a pressure variation.

FIG. 20C illustrates a case in which the pressure touch is recognized by a pressure-touch sensor.

The pressure-touch sensor 14 may be a sensor in which the pressure sensor 144 and the touch sensor 143 are integrated with each other. According to an embodiment, the pressure-touch sensor 14 may additionally realize the function of the pressure sensor 144 in addition to the function of the touch sensor 143. In this case, as illustrated in FIG. 20C, the pressure-touch sensor 14 may be disposed at the lower layer of the display unit 151.

As described above, the realized pressure-touch sensor 14 may replace two sensors, i.e., the touch sensor 143 and the pressure sensor 144 to realize miniaturization of the sensor.

Figure 3:
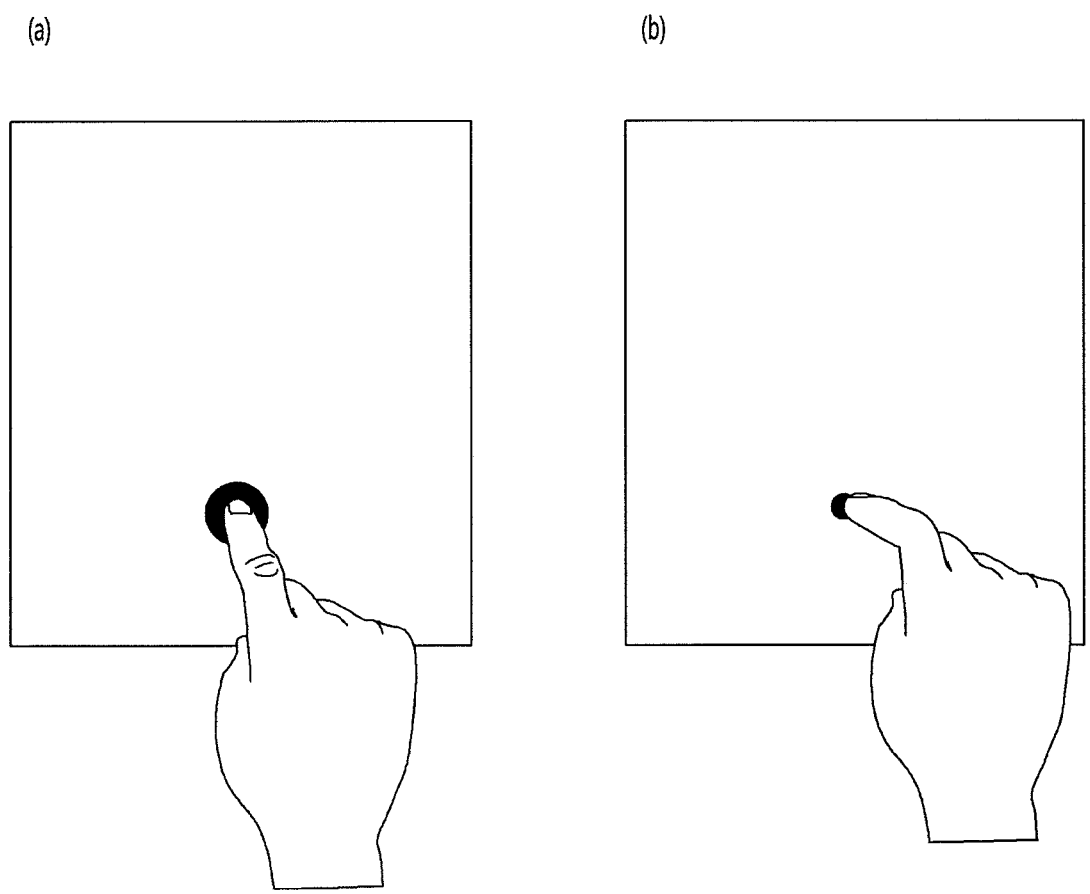
FIG. 3 is a view for explaining the general touch and a haptic touch according to an embodiment of the present invention.

FIG. 3 is a view for explaining the general touch and a haptic touch according to an embodiment of the present invention.

According to an embodiment of the present invention, the touch operation of the user may be classified into a general touch and a haptic touch according to a touch area.

A left drawing (a) illustrates the general touch. When the user normally operates to touch the touch screen, the mobile terminal may recognize the touch as the general touch.

A right drawing (b) illustrates the haptic touch. When the user operates to touch the touch screen by using a finger tip thereof, the mobile terminal recognizes the touch as the haptic touch.

Figure 4:
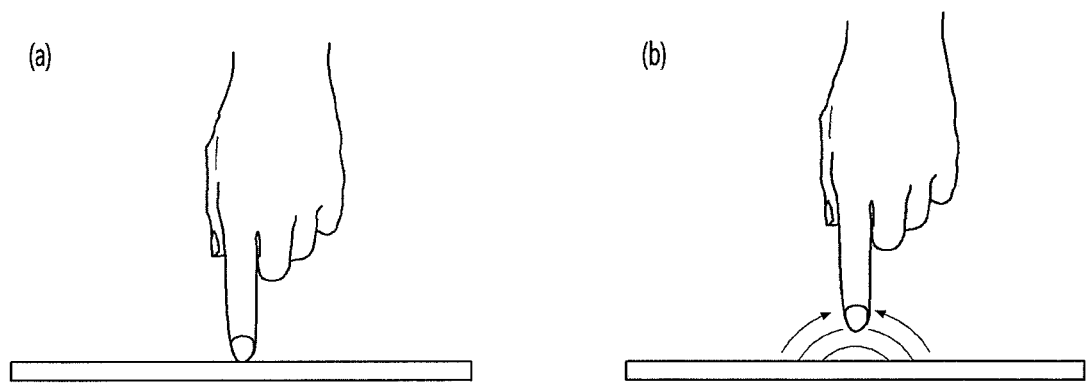
FIG. 4 is a view for explaining the general touch and a proximity touch according to an embodiment of the present invention.

FIG. 4 is a view for explaining the general touch and a proximity touch according to an embodiment of the present invention.

According to an embodiment of the present invention, the touch operation of the user may be classified into the general touch and a proximity touch according to a distance between the finger tip and the touch screen.

A left drawing (a) illustrates the general touch. When the user normally operates to touch the touch screen, the mobile terminal may recognize the touch as the general touch.

A right drawing (b) illustrates the proximity touch. When the user operates to allow the finger be proximate to the touch screen without directly touching the touch screen, the mobile terminal recognizes the operation as the proximity touch.

FIG. 5 is a view illustrating a process of controlling strength of the pressure touch according to an embodiment of the present invention.

According to an embodiment of the present invention, the user may control a pressing pressure of the touch screen to control strength of the pressure touch. The more the pressing pressure of the touch screen by the user increases, the more the strength of the pressure touch may increase.

As illustrated in FIG. 5A, when the user applies a predetermined pressure to press the touch screen, this corresponds to a first step for the pressure touch. In this state, when the pressure increases as illustrated in FIG. 5B, the first step is changed into a second step for the pressure touch. Subsequently, when the pressure further increases as illustrated in FIG. 5C, this corresponds to a third step for the pressure touch.

FIG. 6 is a view illustrating a process of controlling strength of the haptic touch according to an embodiment of the present invention.

According to an embodiment of the present invention, the user may control an area of the touch screen to control strength of the haptic touch. The more the area of the touch screen, which is touched by the user, increases, the more the strength of the haptic touch may increase.

As illustrated in FIG. 6A, when the user touches a predetermined area on the touch screen by using a finger tip thereof, this corresponds to a first step for the haptic touch. In this state, when the contact area slightly increases as illustrated in FIG. 6B, the first step is changed into a second step for the haptic touch. Subsequently, when the area further increases as illustrated in FIG. 6C, this corresponds to a third step for the haptic touch.

FIG. 7 is a view illustrating a process of controlling strength of the proximity touch according to an embodiment of the present invention.

According to an embodiment of the present invention, the user may control a distance between the finger tip and the touch screen to control strength of the proximity touch. The more the distance between the finger tip of the user and the touch screen decreases, the more the strength of the proximity touch may increase.

As illustrated in FIG. 7A, when the finger of the user approaches the touch screen by a predetermined distance, this corresponds to a first step for the proximity touch. In this state, when the finger tip more approaches the touch screen to decrease between the finger tip and the touch screen as illustrated in FIG. 7B, the first step is changed into a second step for the proximity touch. Subsequently, when the finger tip further approaches the touch screen as illustrated in FIG. 7C, this corresponds to a third step for the proximity touch.

Figure 8A:
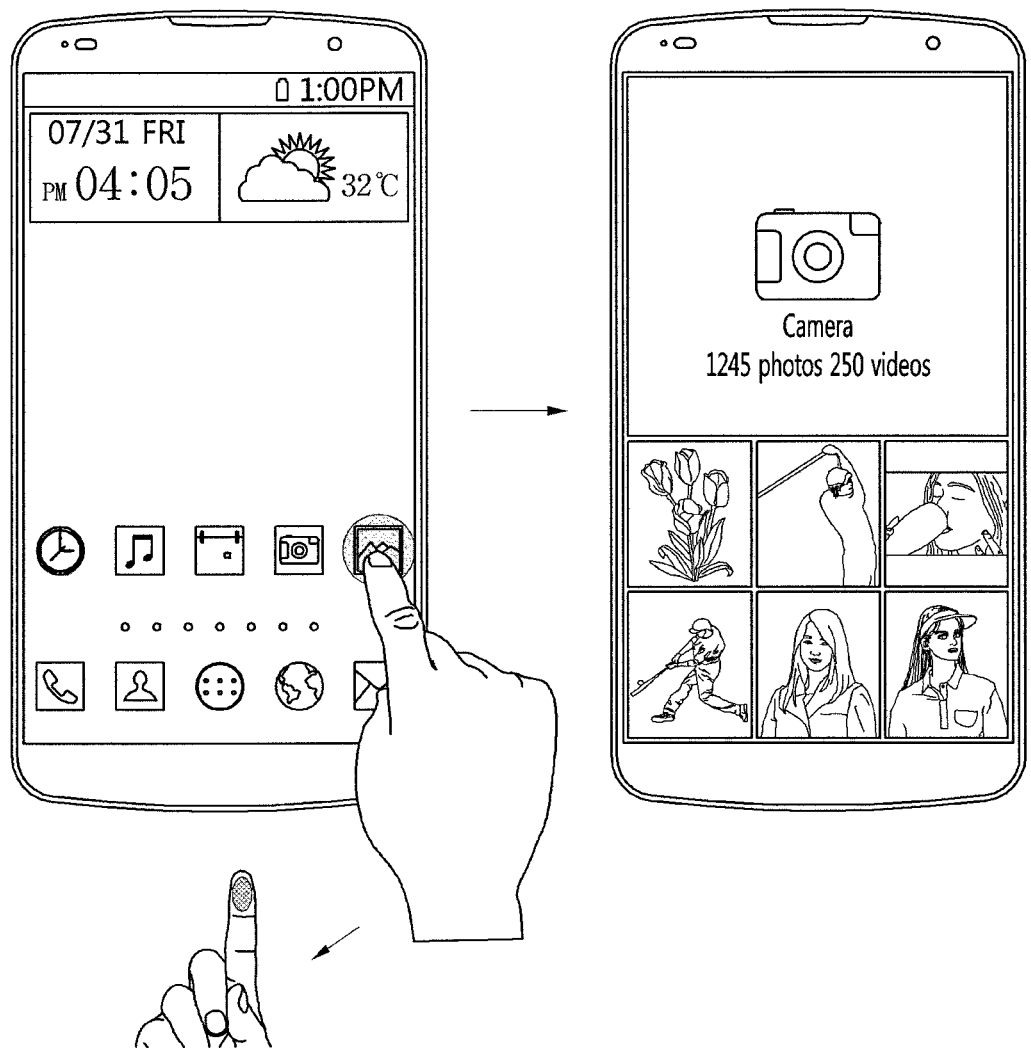
FIGS. 8A and 8B are views illustrating an application that is differently controlled in response to the general touch and the haptic touch according to an embodiment of the present invention.
Figure 8B:
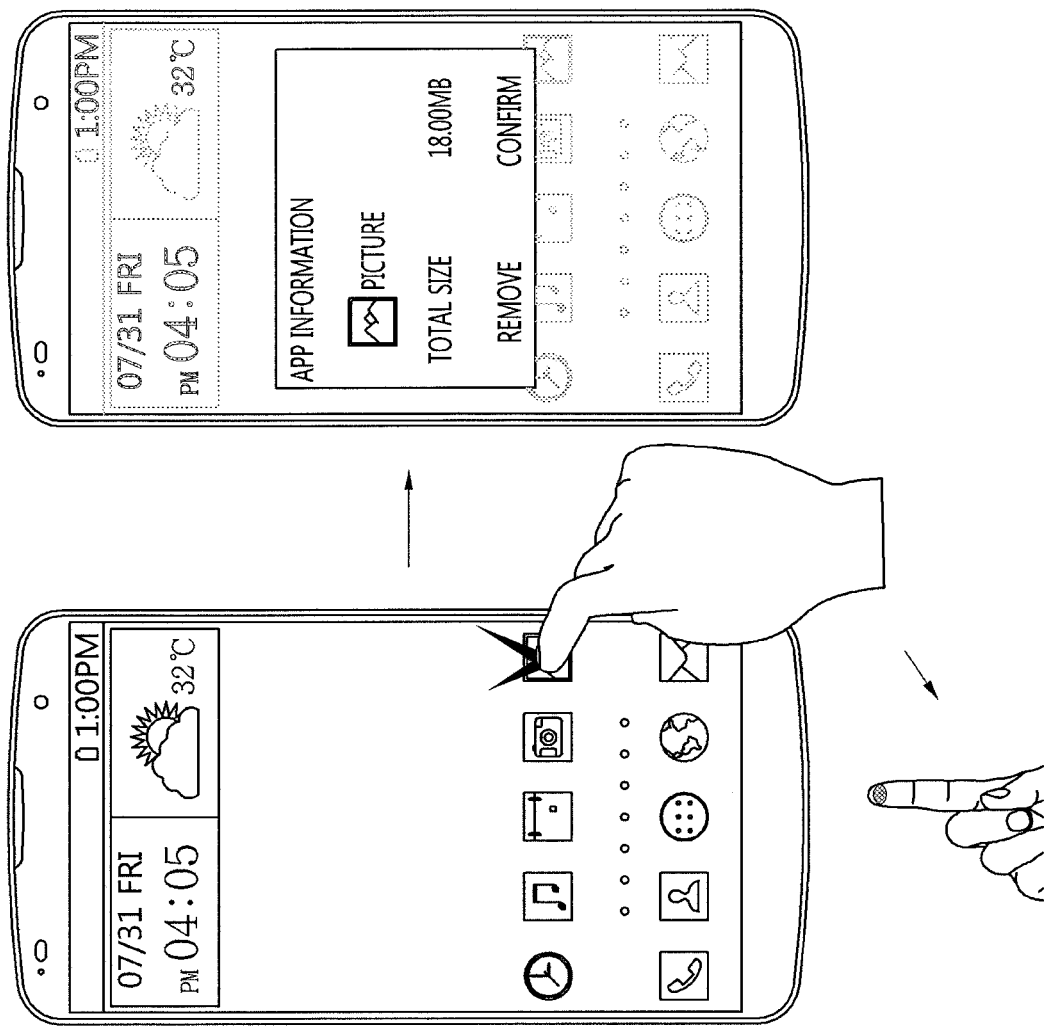

FIGS. 8A and 8B are views illustrating an application that is differently controlled in response to the general touch and the haptic touch according to an embodiment of the present invention.

According to an embodiment of the present invention, the user may selectively input the general touch operation or haptic touch operation to differently control an application. Particularly, the user may selectively input the general touch operation or haptic touch operation to perform different tasks related to the application.

For this, the mobile terminal distinguishes the general touch operation and the haptic touch operation from each other to recognize each operation and then differently performs a subsequent operation on the application according to the inputted operation of the general touch operation or the haptic touch operation. The subsequent operation to the application may include various operations such as execution of the application, preview of the application, termination of the application, and return to a main screen.

In FIGS. 8A and 8B, it is assumed that the user controls a gallery application (or referred to as an App).

As illustrated in FIG. 8A, when the user inputs the general touch operation into a GUI corresponding to the gallery application, the gallery application may be executed. Thus, when the user intends to execute the gallery application, the general touch is performed on the GUI corresponding to the gallery application.

As illustrated in FIG. 8B, when the user inputs the haptic touch operation into the GUI corresponding to the gallery application, information of the gallery application is displayed on the screen in the preview form. Thus, when the user intends to display the information of the gallery appli-cation in the preview form, the GUI corresponding to the gallery application is haptic-touched by using the finger tip.

In FIGS. 8A and 8B, when the user intends to execute the gallery application, the general touch is performed on the GUI corresponding to the corresponding gallery application, and when the user intends to display the information of the gallery application, the haptic touch is performed on the GUI corresponding to the corresponding gallery application. Thus, the user may selectively input the general touch operation or the haptic touch operation into the GUI corresponding to the corresponding application to perform different tasks related to the corresponding application.

Although it is assumed that the general touch operation and the haptic touch operation are selectively inputted in FIGS. 8A and 8B, the selectively inputting operations may be variously modified according to embodiments, such as the pressure touch operation and the proximity touch operation.

Also, although it is assumed that the gallery application is controlled in FIGS. 8A and 8B, all kinds of applications in addition to the gallery application may be controlled in the above-described manner.

Figure 9B:
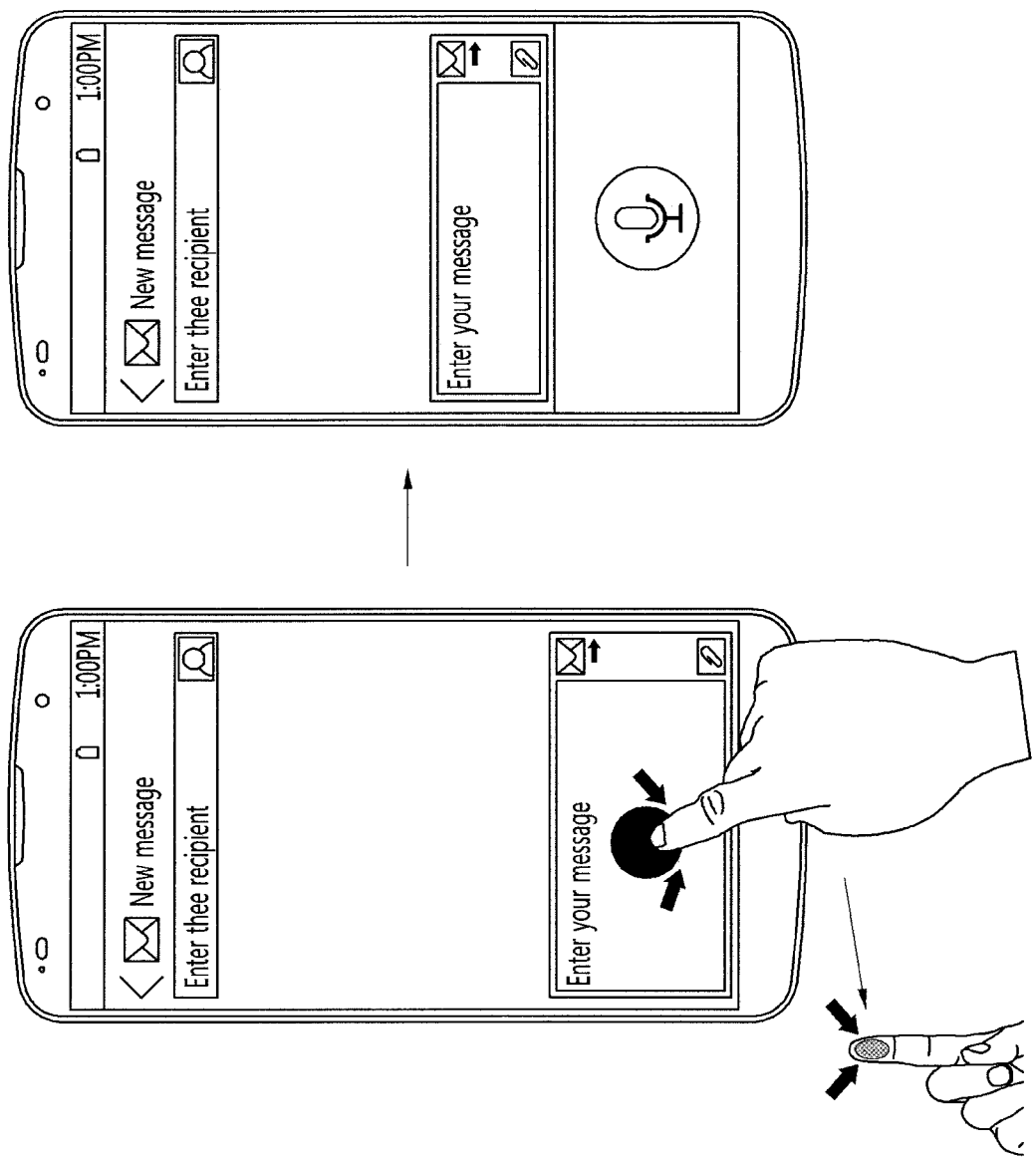

FIGS. 9A and 9B are views illustrating a state in which a different subsequent operation is performed in a write mode in response to the general touch and the pressure touch according to an embodiment of the present invention.

In FIGS. 9A and 9B, it is assumed that the mobile terminal operates in the write mode that writes a message or an e-mail.

In the write mode, when the user performs the general touch on the touch screen, an application is executed. Particularly, a keyboard application may be executed. As illustrated in FIG. 9A, when the user inputs the general touch operation on a message input window in the message write mode, the keyboard application is executed and displayed on the message input window. The user may write a message through the keyboard application.

On the other hand, when the user performs the pressure touch on the touch screen in the write mode, a voice command is executed. Particularly, a GUI corresponding to a voice input tool is displayed on the display screen so that the user inputs the voice command. As illustrated in FIG. 9B, when the user inputs the pressure touch operation on the message input window in the message write mode, the voice command is executed to display the GUI corresponding to the voice input tool on the message input window. The user may input the voice command through the voice input tool to write the message.

Figure 10B:
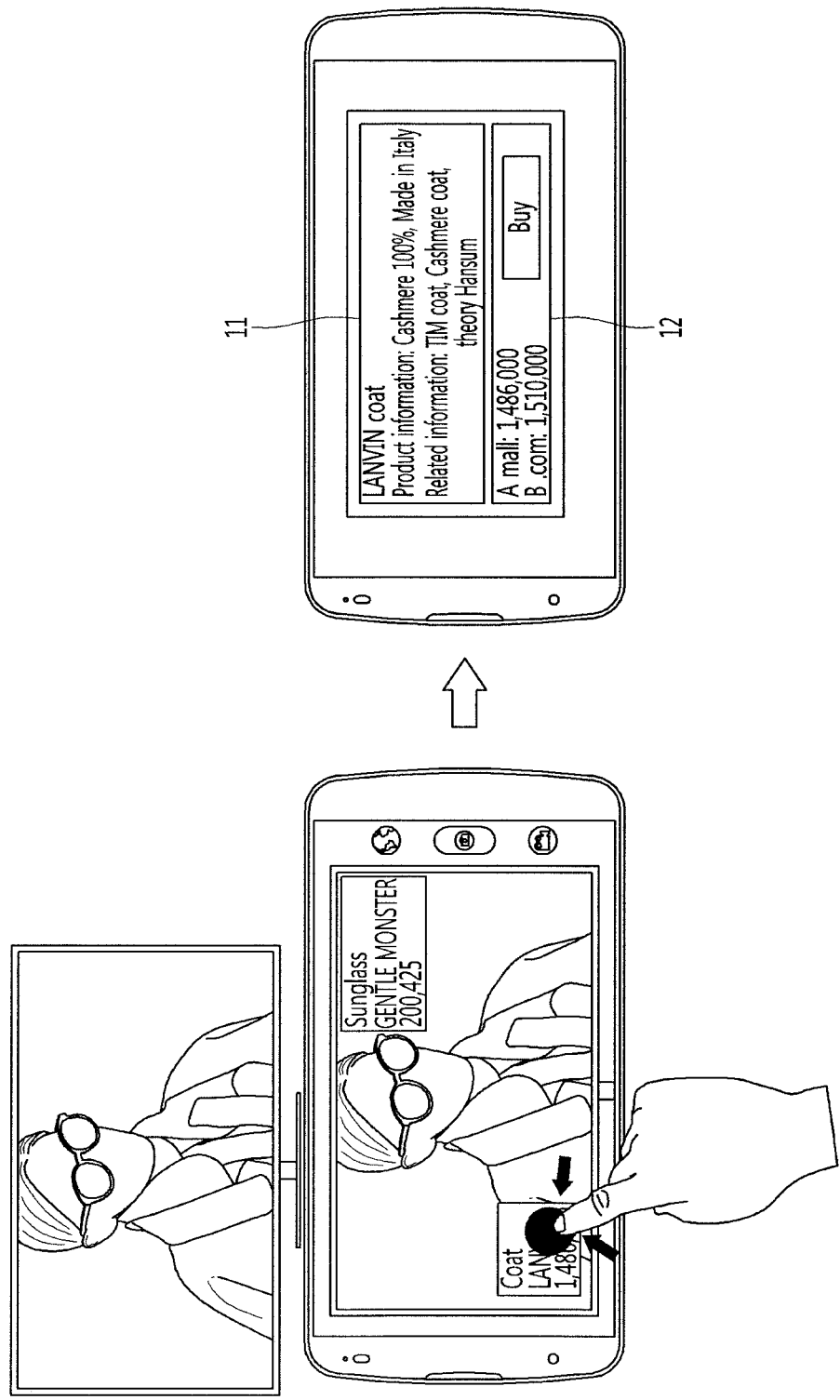

FIGS. 10A and 10B are views illustrating a state in which a different subsequent operation is executed in an augmented reality mode in response to the general touch and the pressure touch according to an embodiment of the present invention.

In FIGS. 10A and 10B, the mobile terminal operates in an augmented reality (AR) mode. When the user illuminates a TV screen by using a camera built in the mobile terminal to execute the AR mode, the mobile terminal operates in the AR mode. The augmented reality refers to superimposing three-dimensional virtual images and pictures on real images or backgrounds. Particularly, when the AR mode is executed, the mobile terminal overlays information on the product processed into the three-dimensional image or the image on the TV screen illuminated by the camera. The information about the product may include a price and a detailed description. If there is no information about the product, the mobile terminal may obtain information about the product through interaction with the Internet, process the obtained information into the form of an image or picture, and tag and display the image on the TV screen illuminated by the camera.

In FIGS. 10A and 10B, the mobile terminal displays the image or picture about the product information on the screen in the superimposed manner. In this case, when the user performs the general touch on the image or picture about the product information, the detailed description about the product information is displayed. On the other hand, when the user performs the pressure touch on the image or picture about the product information, a payment screen is displayed together with the detailed description about the product information.

Referring to FIG. 10A, the user input the general touch operation into the image about the product information displayed on the screen. In this case, the detailed description 11 about the product information is displayed on the screen.

Referring to FIG. 10B, the user input the pressure touch operation into the image about the product information displayed on the screen. In this case, the payment screen 12 is displayed together with the detailed description 11 about the product information. In this case, the user may execute a purchase and payment proceeding step of the selected product.

An object executing the AR mode may be variously modified according to an embodiment.

According to an embodiment, the user may illuminate the surrounding background of the user through the camera of the mobile terminal to allow the mobile terminal to operate in the AR mode. In this case, the mobile terminal grasps which building is in the background of the user to display information on the interior of the building in the form of an image or picture and superimpose the information on the screen. The information about the interior of the building may include information about the restaurant or store located in the building, a price, and a detailed description. The user may input the pressure touch operation on the information about the interior of the building displayed on the form of the image or picture to reserve the restaurant or view the detailed information on a restaurant menu.

Figure 11B:
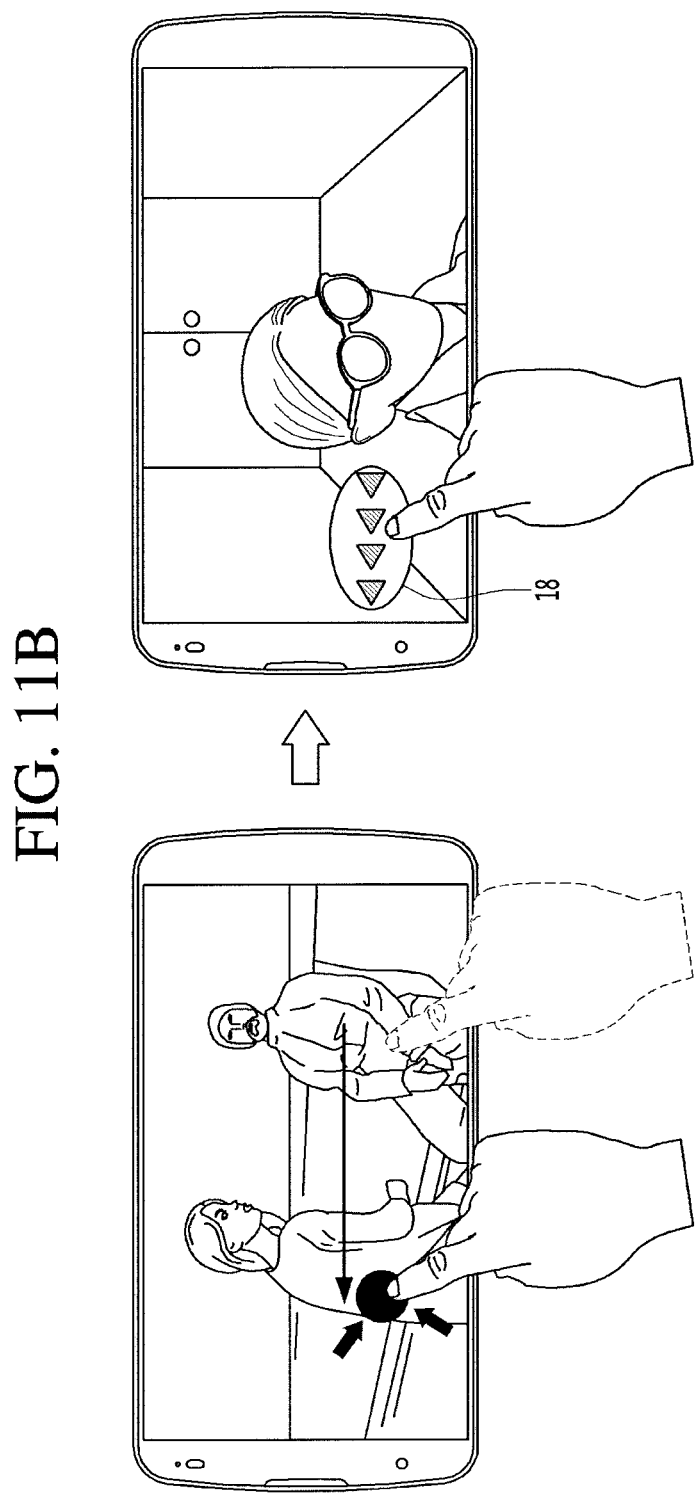

FIGS. 11A and 11B are views illustrating a state in which a different subsequent operation is executed in a video application in response to a drag operation and the pressure touch according to an embodiment of the present invention.

When the user drags the screen, the screen moves to left and right directions on a video list as illustrated in FIG. 11A.

On the other hand, when the user performs the pressure touch after dragging the screen, as illustrated in FIG. 11B, the video may be rewound or fast-forwarded. In this case, an icon indicating a function to be currently performed is displayed at a touched point on the screen, and the user may perform the corresponding function by performing the pressure touch on the icon.

Referring to FIG. 11A, the user drags the screen from the right side to the left side on the screen on which a chapter 4 that is the video list is displayed. In this case, a video about a chapter 3 that is a previous video list is displayed on the screen. In this state, when the user inputs an operation to drag the screen from the left side to the right side, a chapter 4 that is the next video list may be displayed on the screen. It is possible to variously change according to an embodiment whether the previous video or the next video is displayed according to the drag direction.

Referring to FIG. 11B, the user inputs the pressure touch operation after dragging the screen from the right side to the left side during the video playback. In this case, an icon 19 informing a rewinding function is displayed at the point at which the pressure touch operation is inputted. When the user touches the icon 18 informing the rewinding function, the rewinding function starts to be performed.

FIG. 12 is a view illustrating a state in which product information is displayed in the AR mode in response to the drag operation and the pressure touch according to an embodiment of the present invention.

In FIG. 12, it is assumed that the mobile terminal is executed in the AR mode. In this case, as illustrated in FIG. 12, when the user inputs the pressure touch after dragging the screen from the right side to the left side, information about a product that is processed into a three-dimensional image or picture is tagged and displayed on the image screen.

When the AR mode is executed, the mobile terminal may process the information about the product into the three-dimensional image and picture and capture and store the tagged image as a panoramic shot. In this case, the user may input the pressure touch after the drag operation to capture the tagged image as the panoramic shot and move to the next screen or the previous screen of the stored screens. Particularly, when the user inputs the pressure touch after dragging the screen from the right side to the left side, the screen may move to the next capture screen of the captured screens stored in the order of a captured time. When the user input the pressure touch after dragging the screen from the left side to the right side, the screen may move to the previous capture screen of the captured screens stored in the order of the captured time.

Figure 13A:
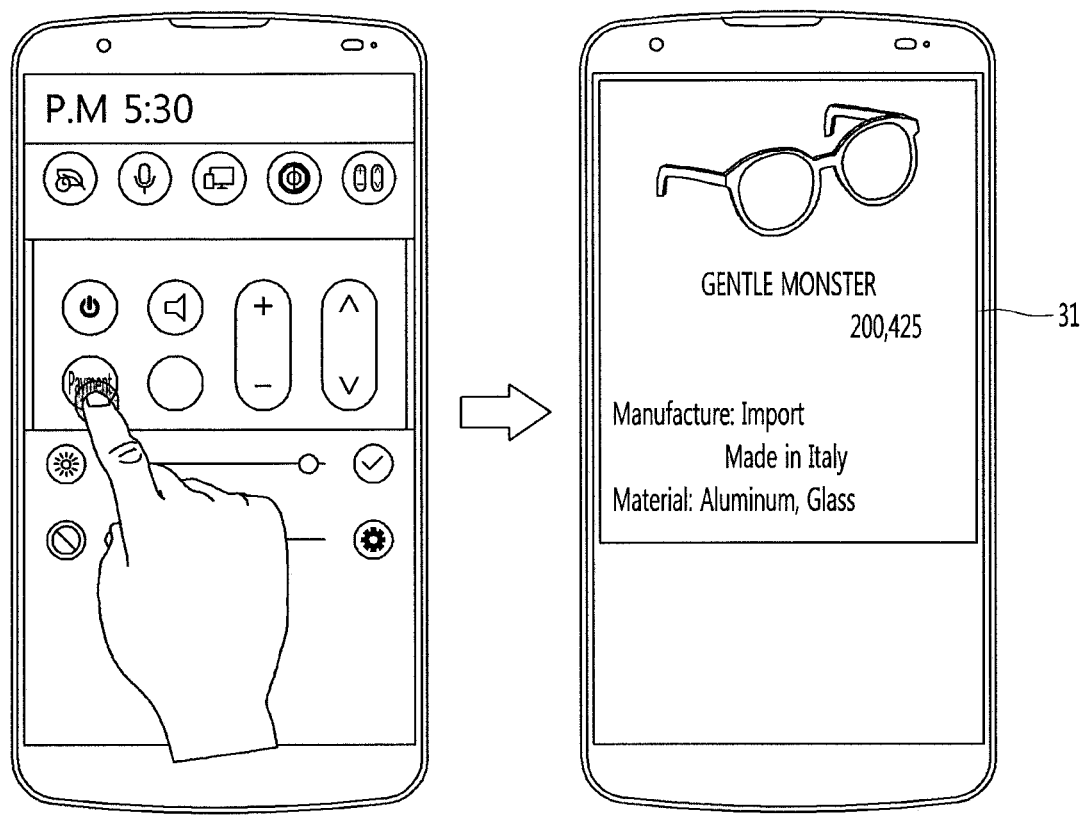
FIGS. 13A and 13B are views illustrating a state in which a different subsequent operation is executed in response to the general touch and the pressure touch when a TV is controlled through the mobile terminal according to an embodiment of the present invention.
Figure 13B:
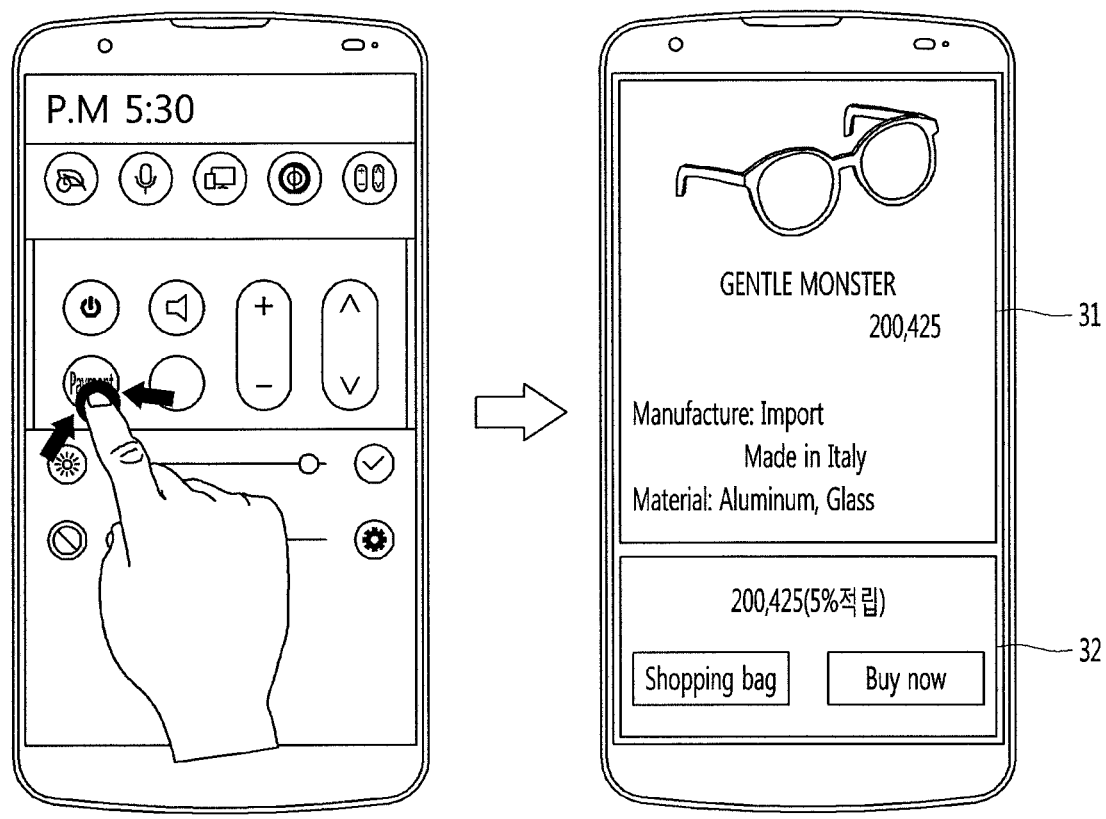

FIGS. 13A and 13B are views illustrating a state in which a different subsequent operation is executed in response to the general touch and the pressure touch when a TV is controlled through the mobile terminal according to an embodiment of the present invention.

The user may control the TV through the mobile terminal. In this case, the mobile terminal operates as a remote controller for controlling the TV to display a remote control key on the screen. For this, the mobile terminal communicates with the TV.

In FIGS. 13A and 13B, it is assumed that the user performs purchase and payment for a product displayed on the TV screen through the remote control screen displayed on the mobile terminal during the TV viewing.

In this case, when the user performs the general touch on a payment button on the remote control screen, a detailed description about the product information is displayed.

On the other hand, when the user performs the pressure touch on a payment button of the remote control screen, a payment screen is displayed together with the detailed description about the product information.

Referring to FIG. 13A, the user inputs the general touch operation into the payment button displayed on the remote control screen. In this case, the detailed description 31 about the product information is displayed on the screen.

Referring to FIG. 13B, the user inputs the pressure touch operation into the payment button displayed on the remote control screen. In this case, the payment screen 32 is displayed together with the detailed description 31 about the product information. In this case, the user may execute a purchase and payment proceeding step of the selected product.

FIG. 14 is a view illustrating a process of controlling an application to correspond to strength of the pressure touch according to an embodiment of the present invention.

According to an embodiment of the present invention, a control step of an application may be differently performed to correspond to strength of the pressure touch.

When the user applies a pressure for the first time, this corresponds to a first step for the pressure touch. Here, when the pressure increases, the step is changed into a second step for the pressure touch. Then, when the pressure further increases, this corresponds to a third step for the pressure touch.

FIG. 14A illustrates a case in which a playback of a playback video is controlled to correspond to the strength of the pressure touch during the execution of the video application. During the video playback, when the user performs the first step for the pressure touch on the screen, the video playback speed is doubled. Here, when the pressing pressure increases by the user to perform the second step for the pressure touch, the video playback speed is faster to four times. Then, when the pressing pressure further increases to perform the third step for the pressure touch, the video playback speed is faster to six times.

FIG. 14A illustrates a case in which a playback volume is controlled during execution of a music application. During the music playback, when inputs the first step for the pressure touch on the screen, the playback volume is higher than the current volume. Here, the pressing pressure increases by the user to input the second step for the pressure touch and the third step for the pressure touch, the touch pressure increases to gradually increase in playback.

When the user input the haptic touch instead of the pressure touch in FIG. 14, the user may set the playback speed so that the playback speed increases as an area contacting a playback icon on the screen increases.

Thus, the user may conveniently control the application with a simple operation of adjusting the touch pressure.

Figure 15:
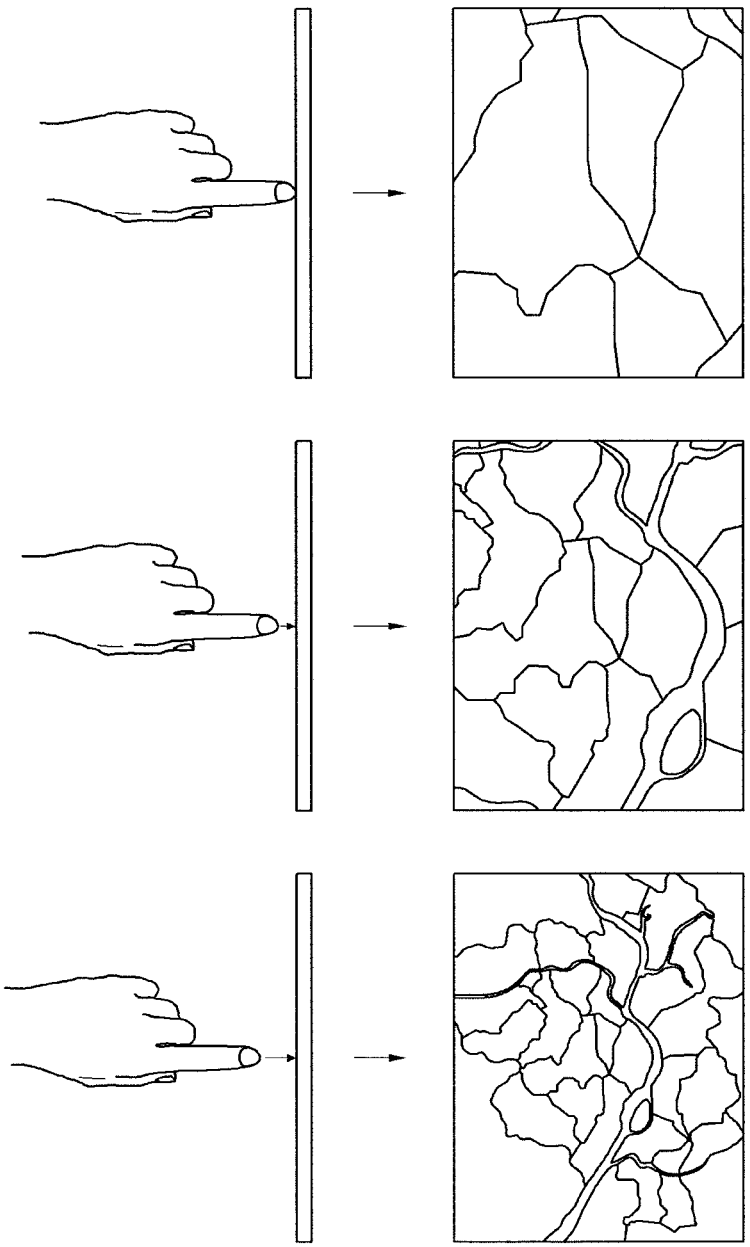
FIG. 15 is a view illustrating a process of controlling an application to correspond to an operation distance of the proximity touch according to an embodiment of the present invention.

FIG. 15 is a view illustrating a process of controlling an application to correspond to an operation distance of the proximity touch according to an embodiment of the present invention.

According to an embodiment of the present invention, a control step of an application may be differently performed to correspond to an operation distance of the proximity touch.

In FIG. 15, it is assumed that the user inputs the proximity touch on the touch screen. When the user initially performs the proximity touch by allowing a finger to approach the touch screen, this corresponds to a first step for the proximity touch. Here, when the finger more approaches the touch screen, the step is changed into a second step for the proximity touch. Then, when the finger is closer to the touch screen, this corresponds to a third step for the proximity touch.

In this case, the mobile terminal may change the control step of the application in response to the steps for the proximity touch. Particularly, during the video playback, the more the distance between the user's finger and the playback icon decreases, the more the playback speed increases. On the other hand, when the user's finger is away from the playback icon, the playback speed may decrease.

Also, in case of executing a map application or a traffic information application, the user may enlarge and display a map by increasing a magnification of the map displayed on the screen while the user's finger gradually approaches the touch screen.

Referring to FIG. 15, when the user performs the first step for the proximity touch on the screen on which the map is displayed, the map is displayed at a predetermined magnification. Here, when the user's finger more approaches the screen to perform the second step for the proximity touch, the map is more enlarged. Furthermore, when the third step for the proximity touch is performed, the map may be more greatly enlarged. That is, the more the user performs the proximity touch to more approach the screen, the more the map may be displayed to be enlarged.

Although it is assumed that the map application is executed in FIG. 15, the application controlled to correspond to the operation distance of the proximity touch may be variously modified. For example, when an SMS application is executed to send or write a text message, the user may zoom in or out of the text message window or text by changing the proximity touch step to the text.

Although it is assumed that the proximity touch is executed in FIG. 15, the application may be controlled by a force touch or the haptic touch instead of the proximity touch. In this case, as the pressing pressure increases, or the touch area on the map increases while touching the map displayed on the screen, the displayed map may be enlarged.

Figure 16:
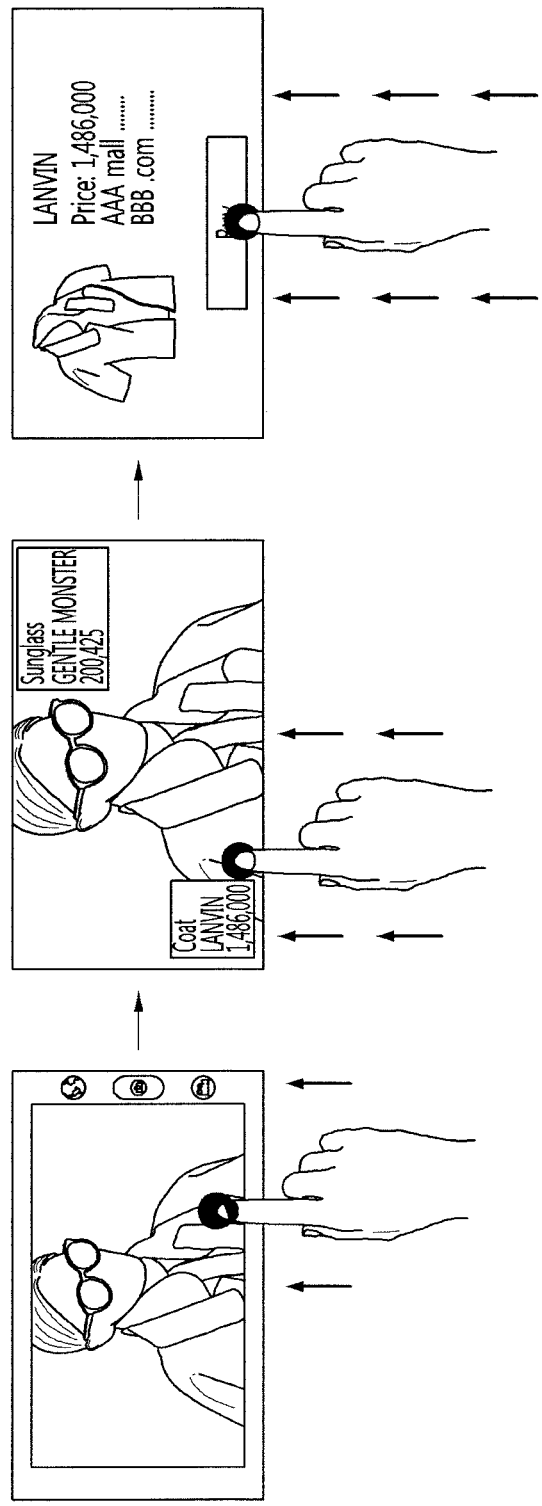
FIG. 16 is a view illustrating a process of controlling an application to correspond strength of the pressure touch according to an embodiment of the present invention.

FIG. 16 is a view illustrating a process of controlling an application to correspond to strength of the pressure touch according to an embodiment of the present invention.

According to an embodiment of the present invention, a step for executing the application may be controlled according to strength of the pressure touch. Particularly, the user may touch the screen while applying a pressure to the screen, and then, the pressure may increase or decrease to control an execution step of the application. For example, the user may sequentially perform a series of procedures related to the product payment to correspond to the strength of the pressure touch.

Referring to FIG. 16, when the user touches the TV through the camera of the mobile terminal to input the first step for the pressure touch on the screen, the AR mode is executed. When the AR mode is executed, the product information that is processed in the three-dimensional picture or image is tagged and displayed on the screen.

The user may input the second step for the pressure touch into the product information that is tagged on the screen to execute the payment function. When the payment function is executed, the screen is switched to a screen for the purchase and payment for the product.

The user inputs the third step for the pressure touch to purchase the product. Thereafter, the user may input the payment information to proceed with the payment.

Thus, the user may easily switch the execution step of the application by using the pressure touch. Particularly, in a series of processes in which one application is executed, the user may apply a larger pressure to touch the screen if it is intended to more to the next step or perform the next step.

For example, while executing an e-mail application, when the first step for the pressure touch is inputted while reading an e-mail, a replay window pops up. When a pressure increases to input the second step for the pressure touch, the keyboard may be executed to allow the user to write an e-mail. Then, when the pressure more increases to perform the third step for the pressure touch, the mail may be sent. Since the series of procedures related to the application is easily performed by using the simple operation of increasing the pressure, the user's convenience may be provided.

Figure 17:
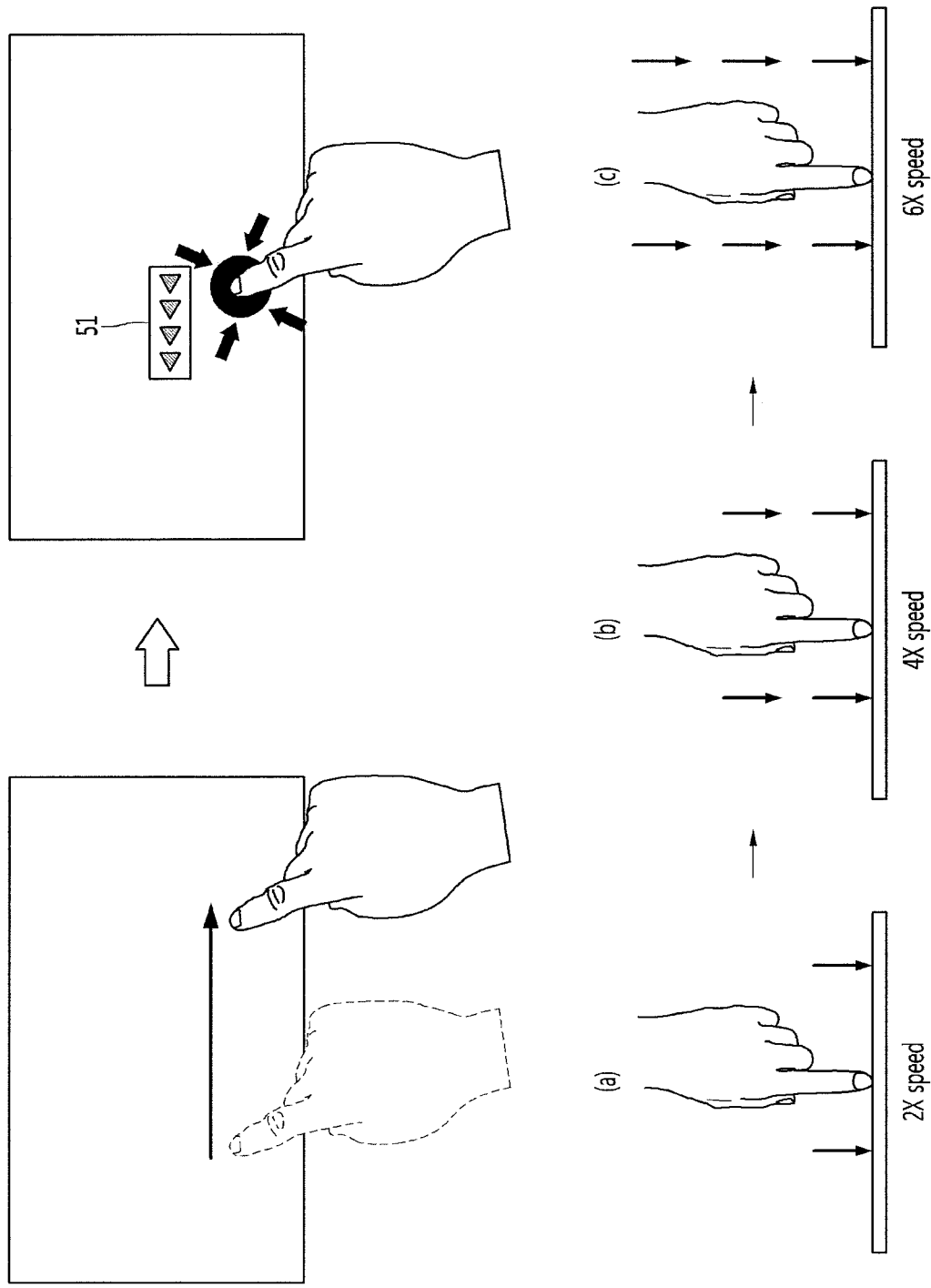
FIG. 17 is a view illustrating a process of controlling an application to correspond to operation strength of the pressure touch according to an embodiment of the present invention.

FIG. 17 is a view illustrating a process of controlling an application to correspond to operation strength of the pressure touch according to an embodiment of the present invention.

According to this embodiment, when the pressure touch is inputted after the drag operation during the video playback, the playback speed of the video may be controlled to correspond to the strength of the pressure touch. In this case, an icon informing a function to be currently performed is displayed at a touched point on the screen, and the user may perform the corresponding function by performing the pressure touch on the icon.

As illustrated in FIG. 17, when the user performs the pressure touch after dragging the screen from the left side to the right side, an icon 51 for controlling the playback speed of the video is displayed. Thus, the user recognizes that the playback speed of the video is capable of being controlled by the pressure touch, and the strength of the pressure touch may be adjusted through the icon 51 to adjust the playback speed of the video.

The more the strength of the pressure touch increases, the more the playback speed may increase. Particularly, as illustrated in FIG. 17A, when the user inputs the first step for the pressure touch on the screen, the playback speed is faster to two times. As illustrated in FIG. 7B, when the user inputs the second step for the pressure touch by increasing the pressing pressure, the playback speed is faster to four times. As illustrated in FIG. 17C, when the pressing pressure more increases to input the third step for the pressure touch, the playback speed may be faster to six times.

According to this embodiment, when the pressure touch is inputted in addition to the existing general touch, since the function that is capable of being controlled through the above-described manner is informed to the user through the icon, the user's convenience may be improved.

Figure 18:
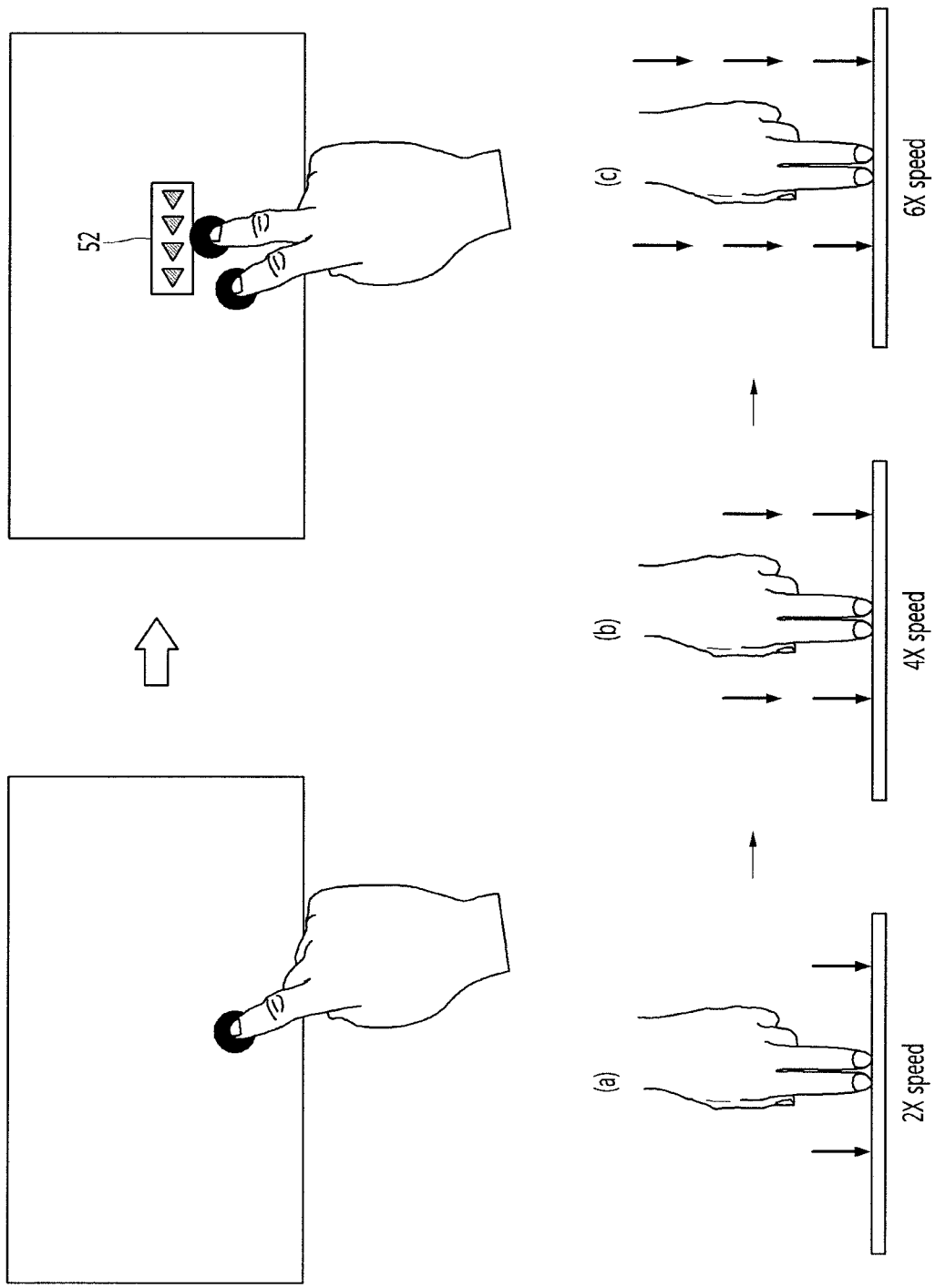
FIG. 18 is a view illustrating a process of controlling an application to correspond to strength of a multi-touch according to an embodiment of the present invention.

FIG. 18 is a view illustrating a process of controlling an application to correspond to strength of a multi-touch according to an embodiment of the present invention.

According to this embodiment, when a multi-touch including a first touch and a second touch is inputted, the control steps of the control operation may be changed to correspond to strength of the second touch.

In this case, when all the first touch and the second touch are inputted, the mobile terminal may display the control function to be executed as an icon so as to be informed to the user. The user may execute the control function through the icon.

In FIG. 18, the first touch input is the general touch, i.e., an operation in which the user touches the screen by using an index finger. The user inputs the second touch while maintaining the first touch input.

The second touch may be the pressure touch as well as the multi-touch. The user touches the screen by using the index finger, and then, to multi-touch the screen by using a middle finger while maintaining the touching of the index finger. In this case, the user may perform a function of controlling the playback speed of the video.

When all the first touch and the second touch are inputted, the mobile terminal displays an icon 52 for controlling the playback speed of the video at a point at which the user inputs the multi-touch. In FIG. 18, the icon 52 for controlling the playback speed of the video at the touched point of the middle finger is displayed.

In this case, the user may increase the pressure strength that presses the screen by using the middle finger to quickly increase the playback rate. Particularly, as illustrated in FIG. 18A, when the user inputs the first step for the pressure touch on the screen, the playback speed is faster to two times. As illustrated in FIG. 18B, when the user inputs the second step for the pressure touch by further applying a pressure, the playback speed is faster to four times. As illustrated in FIG. 18C, when the pressing pressure more increases to change to the third step for the pressure touch, the playback speed may be faster to six times.

Figure 19:
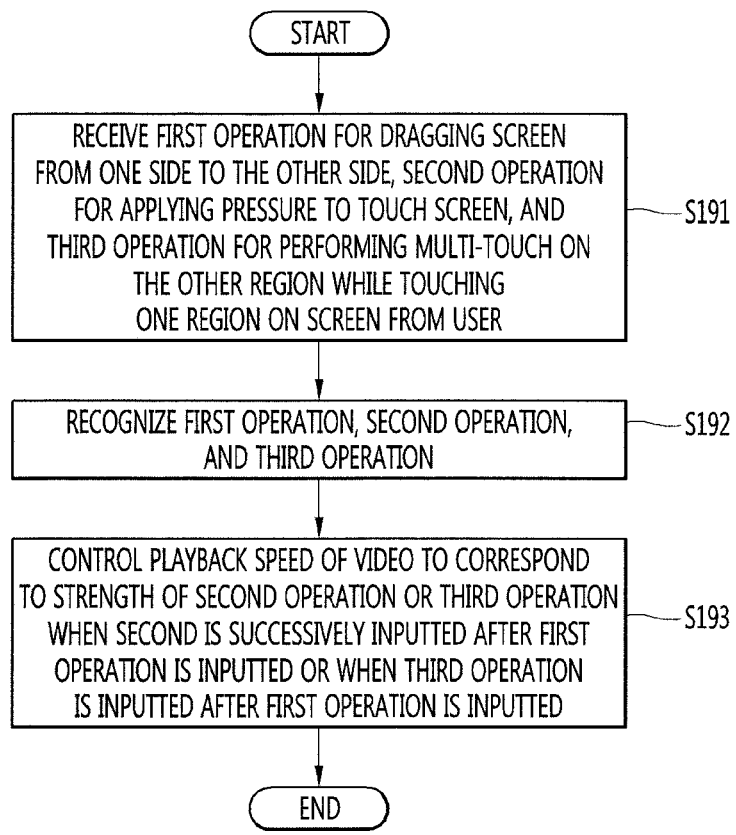
FIG. 19 is a view illustrating a process of controlling the mobile terminal according to an embodiment of the present invention.

FIG. 19 is a view illustrating a process of controlling the mobile terminal according to an embodiment of the present invention.

The mobile terminal receives a first operation for dragging the screen from one side to the other side, a second operation for applying a pressure to touch the screen, and a third operation for performing the multi-touch on the other region while touching one region on the screen from the user (S191).

The mobile terminal recognizes the first operation, the second operation, and the third operation (S192).

When the second operation is successively inputted after the first operation is inputted or when the third operation is inputted after the first operation is inputted, the mobile terminal may control the playback speed of the video to correspond to the strength of the second operation or the third operation (S192).

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the control unit 180 of the mobile terminal. The foregoing embodiments are merely exemplary and are not to be considered as limiting the present invention. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal comprising:
   a wireless communication unit configured to provide wireless communication;
   a touch screen; and
   a controller configured to:
   display a video screen on the touch screen,
   perform a first operation if a second gesture is not sequentially inputted after an input of a first gesture, and
   perform a second operation if the second gesture is sequentially inputted after the input of the first gesture,
   wherein the first gesture is a touch and drag on the touch screen with a first finger,
   wherein the second gesture is a gesture of pressing the touch screen with the first finger or a second finger while the first finger remains touched to the touch screen after the first gesture, wherein the first operation is an operation of changing a video on the video screen, wherein the second operation is an operation of controlling a playback speed of the video on the video screen based on a strength of the second gesture, and wherein the controller is further configured to:

increase the playback speed of the video when the strength of the second gesture increases, and reduce the playback speed of the video when the strength of the second gesture decreases.

2. The mobile terminal according to claim 1, wherein the touch and drag comprises dragging the touch screen from a left side to a right side, and wherein the second finger is a middle finger and the first finger is an index finger.

3. The mobile terminal according to claim 1, wherein the touch and drag comprises dragging the touch screen from a right side to a left side, and wherein the second finger is an index finger and the first finger is a middle finger.

4. The mobile terminal according to claim 1, wherein the controller is further configured to display an identifier for informing an end time of the video on the touch screen and end the playback of the video in response to the controlling the playback speed of the video reaching the end time of the video.

5. The mobile terminal according to claim 1, wherein the controller is further configured to display a playback speed icon on the touch screen for controlling the playback speed of the video at a location of the second gesture.

6. The mobile terminal according to claim 1, wherein the first gesture with the first finger and the second gesture with the second finger comprises a multi-touching operation.

7. The mobile terminal according to claim 1, wherein the touch screen includes an electrostatic touch sensor configured to determine the strength of the second gesture based on a voltage recognized by the touch sensor.

8. The mobile terminal according to claim 1, further comprising:

at least one pressure sensor configured to determine the strength of the second gesture based on a pressure recognized by the at least one pressure sensor.

9. The mobile terminal according to claim 1, further comprising:

a pressure-touch sensor including an integrated pressure and touch sensor configured to determine the strength of the second gesture.

10. The mobile terminal according to claim 1, wherein the controller is further configured to display a next video in a video list for changing the video on the video screen.

11. A method of controlling a mobile terminal, the method comprising:

displaying, via a controller of the mobile terminal, a video screen on a touch screen of the mobile terminal;

performing, via the controller, a first operation if a second gesture is not sequentially inputted after an input of a first gesture; and performing, via the controller, a second operation if the second gesture is sequentially inputted after the input of the first gesture, wherein the first gesture is a touch and drag on the touch screen with a first finger, wherein the second gesture is a gesture of pressing the touch screen with the first finger or a second finger while the first finger remains touched to the touch screen after the first gesture, wherein the first operation is an operation of changing a video on the video screen, wherein the second operation is an operation of controlling a playback speed of the video on the video screen based on a strength of the second gesture, and wherein the method further comprises:

increasing the playback speed of the video when the strength of the second gesture increases; and reducing the playback speed of the video when the strength of the second gesture decreases.

12. The method according to claim 11, wherein the touch and drag comprises dragging the touch screen from a left side to a right side, and wherein the second finger is a middle finger and the first finger is an index finger.

13. The method according to claim 11, wherein the touch and drag comprises dragging the touch screen from a right side to a left side, and wherein the second finger is an index finger and the first finger is a middle finger.

14. The method according to claim 11, further comprising:

displaying an identifier for informing an end time of the video on the touch screen and ending playback of the video in response to the controlling the playback speed of the video reaching an end time of the video.

15. The method according to claim 11, further comprising:

displaying a playback speed icon on the touch screen for controlling the playback speed of the video at a location of the second gesture.

16. The method according to claim 11, wherein the first gesture with the first finger and the second gesture with the second finger comprises a multi-touching operation.

17. The method according to claim 11, further comprising:

determining the strength of the second gesture based on a voltage recognized by an electrostatic touch sensor of the touch sensor.

18. The method according to claim 11, further comprising:

determining the strength of the second gesture based on a pressure recognized by a pressure sensor.

19. The method according to claim 11, further comprising:

determining the strength of the second gesture via a pressure-touch sensor including an integrated pressure and touch sensor.

20. The mobile terminal according to claim 11, further comprising:

displaying a next video in a video list for changing the video on the video screen.

* * * * *